US010000184B2

(12) United States Patent
Nagata et al.

(10) Patent No.: US 10,000,184 B2
(45) Date of Patent: Jun. 19, 2018

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Yuya Nagata, Aichi-ken (JP); Takahiro Osaki, Aichi-ken (JP); Takuhiro Saito, Aichi-ken (JP); Tomonari Umakoshi, Aichi-ken (JP)

(73) Assignee: KABUSHIKI KAISHA TOKAI-RIKA-DENKI-SEISAKUSHO, Aichi-Ken (JP)

( * ) Notice: Subject to any disclaimer, the term of this patent is extended or adjusted under 35 U.S.C. 154(b) by 117 days.

(21) Appl. No.: 15/162,162

(22) Filed: May 23, 2016

(65) Prior Publication Data
US 2016/0347277 A1 Dec. 1, 2016

(30) Foreign Application Priority Data

May 27, 2015 (JP) ................................. 2015-107633

(51) Int. Cl.
B60R 22/44 (2006.01)
B60R 22/46 (2006.01)
B60R 22/34 (2006.01)

(52) U.S. Cl.
CPC .............. *B60R 22/44* (2013.01); *B60R 22/34* (2013.01); *B60R 22/46* (2013.01); *B60R 2022/468* (2013.01); *B60R 2022/4666* (2013.01)

(58) Field of Classification Search
CPC .......... B60R 22/34; B60R 22/44; B60R 22/46
See application file for complete search history.

(56) References Cited

U.S. PATENT DOCUMENTS

| 2005/0224621 | A1 | 10/2005 | Mori | |
| 2013/0341451 | A1* | 12/2013 | Saito | B60R 22/46 |
| | | | | 242/381.5 |
| 2016/0244020 | A1* | 8/2016 | Umakoshi | B60R 22/46 |
| 2016/0311398 | A1* | 10/2016 | Osaki | B60R 22/44 |

FOREIGN PATENT DOCUMENTS

| EP | 1731387 | 12/2006 |
| JP | 2005-324772 | 11/2005 |
| JP | 2014-004852 A | 1/2014 |

OTHER PUBLICATIONS

Office Action issued in the corresponding Japanese Application No. 2015-107633 dated Jan. 31, 2017.
Extended European Search Report EP Application No. 16171231. 0-1503/3098121 dated Nov. 11, 2016.

* cited by examiner

Primary Examiner — Sang K Kim
(74) Attorney, Agent, or Firm — Roberts Mlotkowski Safran Cole & Calderon P.C.

(57) ABSTRACT

A webbing take-up device includes a spool that takes up webbing worn by an occupant, an input gear that is rotated by rotation force being transmitted, a spool gear that rotates the spool by being rotated, and a second clutch that is provided between the input gear and the spool gear, and that transmits rotation force of the input gear to the spool gear by being rotated by the input gear. The webbing take-up device further includes a sub clutch spring that is provided between the input gear and the second clutch, that transmits rotation force of the input gear to the second clutch when the input gear is rotated toward one side, and that shuts off transmission of rotation force of the input gear to the second clutch when the input gear is rotated toward another side.

8 Claims, 19 Drawing Sheets

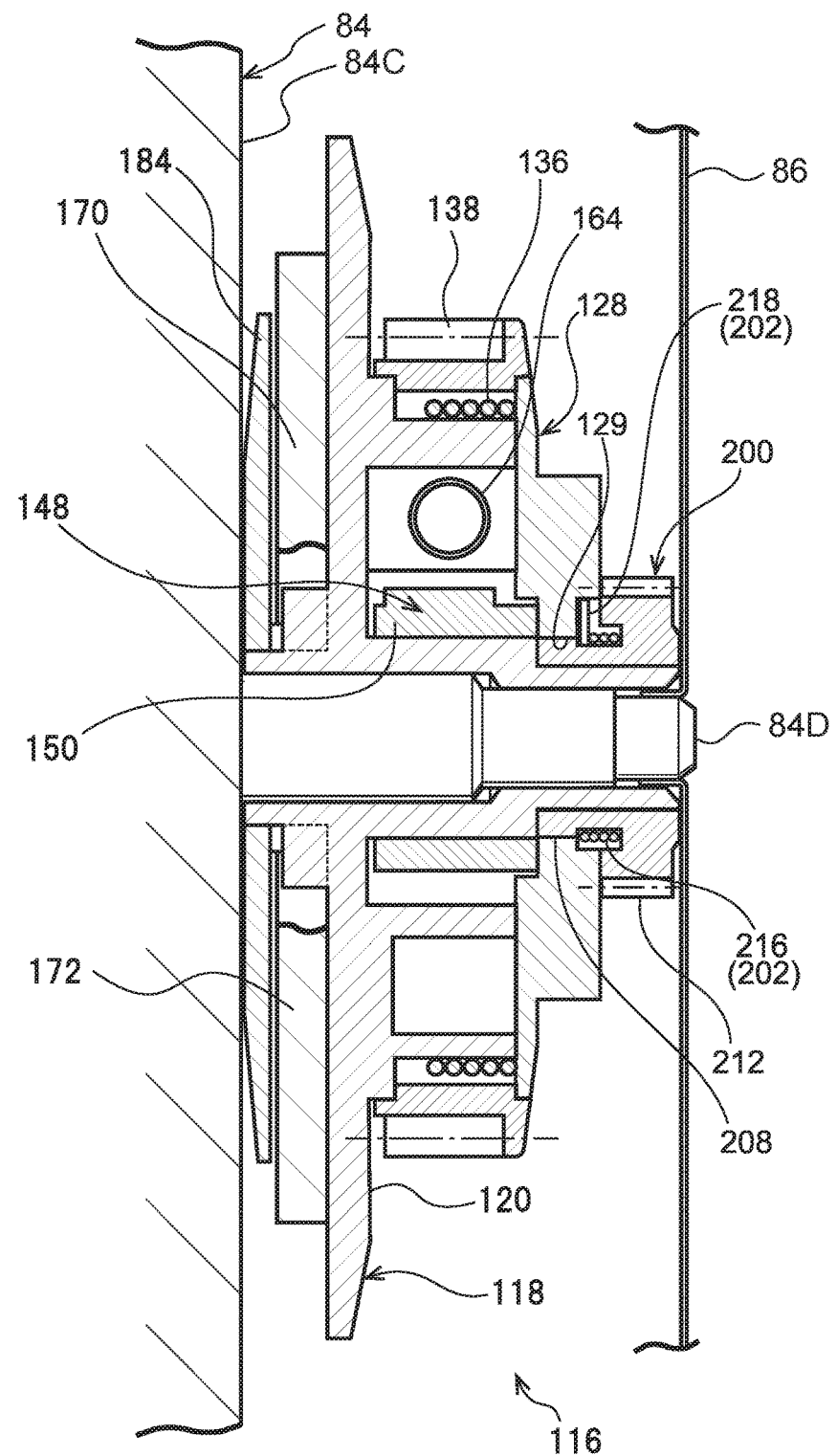

WEBBING TAKE-UP DEVICE

CROSS-REFERENCE TO RELATED APPLICATION

This application claims priority under 35 USC 119 from Japanese Patent Application No. 2015-107633, filed May 27, 2015, the disclosure of which is incorporated by reference herein.

BACKGROUND

Field of the Invention

The present invention relates to a webbing take-up device.

Related Art

Japanese Patent Application Laid-Open (JP-A) No. 2014-4852 describes a webbing take-up device in which a clutch provided between a motor and a spool is rotated by the motor, thereby enabling rotation of the motor to be transmitted to the spool. Configuration is made such that when the clutch is rotated toward one side by the motor, the rotation of the motor toward the one side is transmitted to the spool, and configuration is also made such that when the clutch is rotated toward another side by the motor, the rotation of the motor toward the another side is not transmitted to the spool.

However, in the webbing take-up device described in JP-A No. 2014-4852, configuration is made such that when the motor rotates, the clutch is rotated irrespective of the rotation direction thereof. Namely, the clutch is rotated even in a case in which there is no need for the clutch to rotate (a case in which the motor rotates toward the another side). Inertia therefore arises due to the rotation of the clutch when the motor rotates toward the another side, resulting in motor operation loss.

SUMMARY

In consideration of the above circumstances, the present invention is to obtain a webbing take-up device capable of suppressing rotation of a clutch in a case in which the clutch does not transmit rotation force to a spool.

A webbing take-up device of a first aspect includes: a spool that takes up a webbing worn by an occupant; a first rotating body that is rotated by rotation force being transmitted thereto; a second rotating body that rotates the spool by the second rotating body being rotated; a clutch that is provided between the first rotating body and the second rotating body, and that transmits rotation force of the first rotating body to the second rotating body by the clutch being rotated by the first rotating body; and a sub clutch that is provided between the first rotating body and the clutch, that transmits rotation force of the first rotating body to the clutch in a case in which the first rotating body is rotated toward another side, and that blocks transmission of the rotation force of the first rotating body to the clutch in a case in which the first rotating body is rotated toward one side.

A webbing take-up device of a second aspect is the webbing take-up device of the first aspect, wherein: the sub clutch is configured by a sub clutch spring that includes a coil portion wound in a ring shape, a part of the sub clutch being caught at the clutch; the rotation force of the first rotating body is transmitted to the clutch by the coil portion making pressing contact with the first rotating body in a case in which the first rotating body is rotated toward the another side; and transmission of the rotation force of the first rotating body to the clutch is blocked by the first rotating body rotating idly with respect to the coil portion in a case in which the first rotating body is rotated toward the one side.

A webbing take-up device of a third aspect is the webbing take-up device of the second aspect, wherein: the first rotating body is configured including a shaft portion that is rotatably supported by the clutch, and a gear portion that is integrally provided at the shaft portion; and at least a portion of the coil portion is disposed at a radial direction inner side of the gear portion.

In the above aspects, it is possible that the coil portion of the sub clutch is wound (on the shaft portion) in a direction such that: diameter dimension of the coil portion decreases in the case in which the first rotating body is rotated toward the another side (due thereto, the coil portion making pressing contact with the first rotating body; and the diameter dimension of the coil portion increases in the case in which the first rotating body is rotated toward the one side (due thereto, the first rotating body rotating idly with respect to the coil portion).

In the webbing take-up device of the first aspect, the webbing worn by an occupant is taken up onto the spool. The webbing can be worn by the occupant of a vehicle by pulling the webbing out from the spool. In the aspect, in the case in which the first rotating body is rotated toward the another side, rotation force of the first rotating body is transmitted to the clutch through the sub clutch. The clutch is accordingly rotated, the rotation force of the first rotating body is transmitted to the second rotating body, and the second rotating body rotates the spool. In the case in which the first rotating body is rotated toward the one side, the rotation force of the first rotating body is not transmitted to the clutch through the sub clutch. Namely, the clutch is not rotated by the first rotating body. The present aspect thereby enables rotation of the clutch to be suppressed in a case in which the clutch does not transmit rotation force of the first rotating body to the spool through the second rotating body.

In the webbing take-up device of the second aspect, when the first rotating body is rotated toward the another side, the coil portion of the sub clutch spring makes pressing contact with the first rotating body. Accordingly, rotation force of the first rotating body is transmitted to the clutch through the sub clutch spring, and the clutch is rotated. The rotation force of the first rotating body is thereby transmitted to the second rotating body through the clutch, and the second rotating body rotates the spool. When the first rotating body is rotated toward the one side, the first rotating body rotates idly (spins freely) with respect to the coil portion of the sub clutch spring. Accordingly, the rotation force of the first rotating body is not transmitted to the clutch through the sub clutch spring. Namely, the clutch is not rotated by the first rotating body. The present aspect thereby enables rotation of the clutch to be suppressed in a case in which the clutch does not transmit rotation force of the first rotating body to the spool through the second rotating body.

In the webbing take-up device of the third aspect, at least a part of the coil portion of the sub clutch spring is disposed at the radial direction inner side of the gear portion of the first rotating body, thereby enabling space to be saved in a space (smaller) where the sub clutch spring is disposed between the first rotating body and the clutch. This thereby enables an increase in size of the webbing take-up device to be suppressed.

BRIEF DESCRIPTION OF THE DRAWINGS

Exemplary embodiment of the invention will be described with reference to the following figures, wherein:

FIG. 8 is a cross-section taken along an axial direction of a second clutch;

FIG. 9A is a side view illustrating a normal state of a clutch spring, and FIG. 9B is a side view illustrating a state in which an external diameter dimension of a coil portion of the clutch spring has been enlarged;

DETAILED DESCRIPTION

Explanation follows regarding a webbing take-up device of an exemplary embodiment, with reference to FIG. 1 to FIG. 13.

Figure 1:
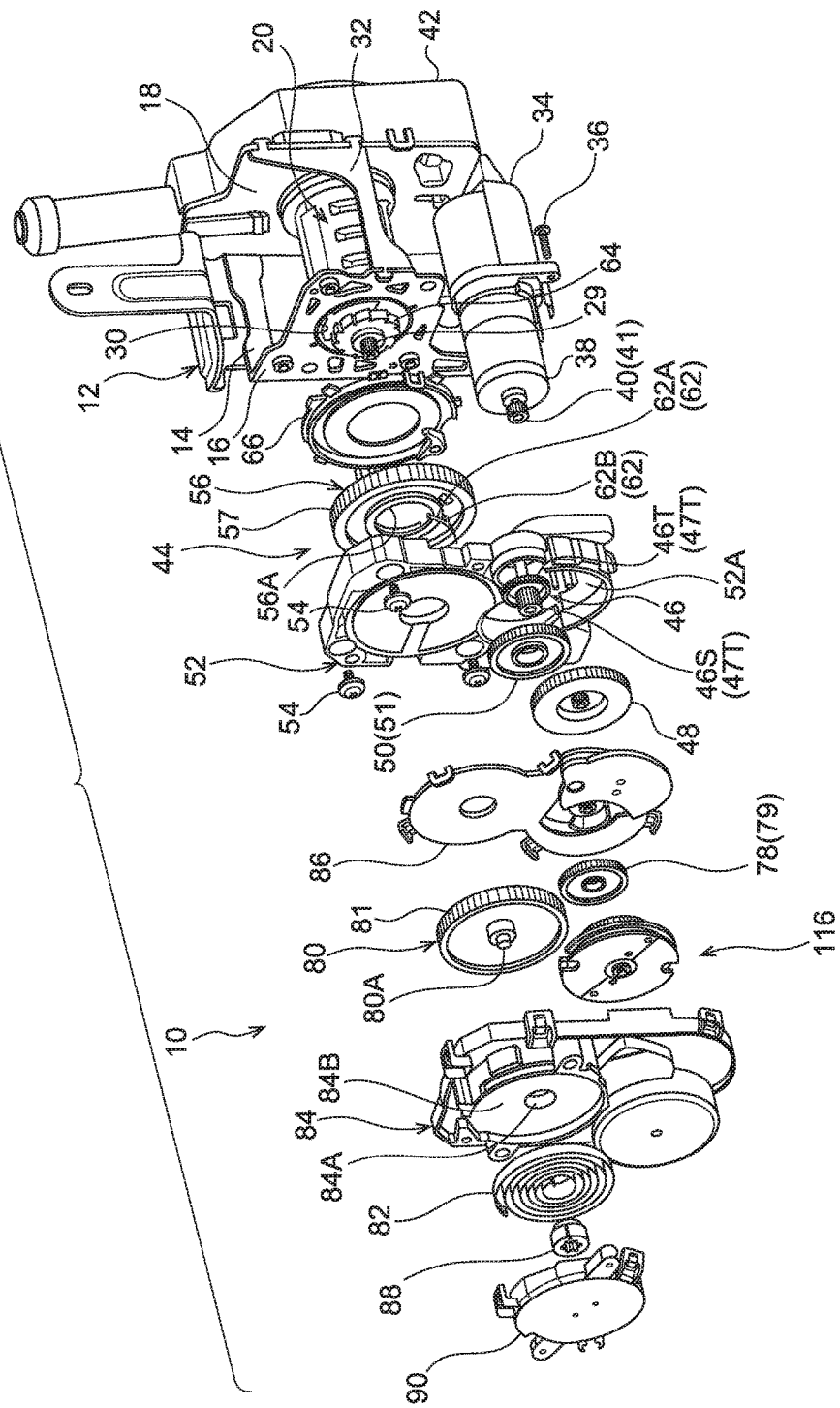
FIG. 1 is an exploded perspective view illustrating a webbing take-up device according to an exemplary embodiment.

FIG. 1 is an exploded perspective view illustrating a webbing take-up device 10 according to an exemplary embodiment. As illustrated in FIG. 1, the webbing take-up device 10 includes a frame 12. The frame 12 includes a substantially plate shaped back plate 14. The back plate 14 is fixed to a vehicle body by a fastening member, not illustrated in the drawings, such as a bolt, thereby fixing the webbing take-up device 10 to the vehicle body. A pair of parallel leg pieces 16, 18 extend from both width direction ends of the back plate 14, and a spool 20, manufactured by die-casting or the like, is rotatably disposed between the leg pieces 16, 18. Note that a connection piece 32 spans between the leg piece 16 and the leg piece 18.

The spool 20 is formed in a substantially circular cylinder shape. A base end portion of webbing formed in an elongated strap shape, not illustrated in the drawings, is fixed to the spool 20. Rotating the spool 20 toward one direction about its axis (in a direction referred to below as the "take-up direction") takes up the webbing onto an outer peripheral portion of the spool 20 in a layered shape from a base end side. Pulling the webbing from a leading end side pulls out the webbing that has been taken up onto the outer peripheral portion of the spool 20, accompanying which the spool 20 rotates in the opposite direction to the rotation direction when taking up the webbing (the rotation direction of the spool 20 when pulling out the webbing is referred to below as the "pull-out direction").

A support shaft portion 29 stands out from an axial center portion at an end portion on the leg piece 16 side of the spool 20. The support shaft portion 29 passes through a circular hole 30 formed in the leg piece 16 substantially coaxially, and projects out to the outside of the frame 12. A ratchet 64, described later, is fixed to the support shaft portion 29 at a projection direction base end side of the support shaft portion 29. The ratchet 64 is thus capable of rotating together with the spool 20.

A motor 38 is fixed to a gear housing 52, described later, by a motor cover 34 and a screw 36. The motor 38 is disposed below the spool 20, and between the pair of leg pieces 16, 18 of the frame 12. An A-gear 40 formed with plural outer teeth 41 at an outer peripheral portion is fixed to an output shaft of the motor 38.

A support shaft portion, not illustrated in the drawings, stands out from an end portion on the leg piece 18 side of the spool 20. The support shaft portion passes substantially coaxially through a ratchet hole, not illustrated in the drawings, formed in the leg piece 18, and projects out to the outside of the frame 12. A lock base, on which a lock plate configuring part of a lock mechanism is supported, is fixed to the support shaft portion. In a vehicle emergency (for example, during sudden deceleration of the vehicle), the lock plate projects out from the lock base, and meshes together with an inner peripheral portion of the ratchet hole formed in the leg piece 18, preventing rotation of the spool 20 in the pull-out direction. A cover 42 that covers the lock mechanism and the like is fixed to the leg piece 18.

A gear housing 52, in which a first clutch 44, a B-gear 46, an OL-gear 48, and a C-gear 50 are housed, is fixed to the leg piece 16 by a screw 54.

Figure 2:
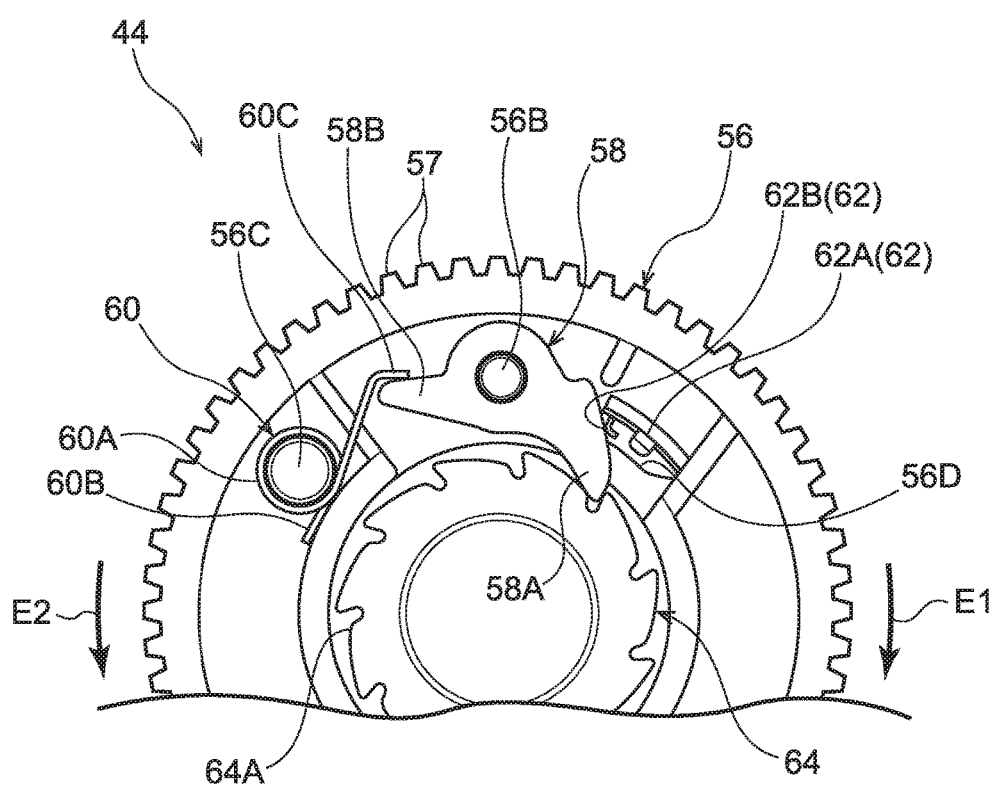
FIG. 2 is a side view of a first clutch as viewed from the side of a leg piece of a frame, illustrating a state in which a lock bar is engaged with a ratchet.

As illustrated in FIG. 2, the first clutch 44 is configured including a clutch gear 56 formed in a ring shape, a lock bar 58 and return spring 60 that are attached to the clutch gear 56, a friction spring 62, and the ratchet 64 that is fixed to the spool 20.

Specifically, plural outer teeth 57 are formed to an outer peripheral portion of the clutch gear 56, and, as illustrated in FIG. 1, a circular insertion hole 56A, through which the support shaft portion 29 of the spool 20 is inserted, is formed at an inner peripheral portion of the clutch gear 56. As illustrated in FIG. 2, a lock bar support shaft 56B and a return spring support shaft 56C that project out toward the leg piece 16 side and that are disposed at a separation to each other in the circumferential direction of the clutch gear 56 stand out from a radial direction intermediate portion of the clutch gear 56. A friction spring insertion hole 56D, through which part of the friction spring 62 is inserted, is formed at a circumferential direction intermediate portion of the clutch gear 56. As illustrated in FIG. 1, the clutch gear 56 described above is housed inside a housing recess formed on the leg piece 16 side of the gear housing 52. A first seat 66 is attached to the gear housing 52, thereby restricting movement of the clutch gear 56 toward the leg piece 16 side.

As illustrated in FIG. 2, the lock bar 58 is formed in a substantially half-moon shape as viewed along the axial direction of the clutch gear 56, and the lock bar 58 is capable of tilt-moving due to being supported by the lock bar support shaft 56B provided to the clutch gear 56. One end portion of the lock bar 58 configures a ratchet engagement portion 58A that engages with the ratchet 64, and another end portion of the lock bar 58 configures a return spring abutting portion 58B that the return spring 60 abuts.

The return spring 60 includes a coil portion 60A that is wound into a ring shape and that is supported by the return spring support shaft 56C provided to the clutch gear 56. One end portion of the return spring 60 configures a catch portion 60B that extends out from the coil portion 60A and is caught to part of the clutch gear 56. Another end portion of the return spring 60 configures an abutting portion 60C that extends out from the coil portion 60A and abuts the return spring abutting portion 58B of the lock bar 58. Urging force of the return spring 60 is input to the return spring abutting portion 58B of the lock bar 58, such that the ratchet engagement portion 58A of the lock bar 58 is kept separate from the ratchet 64.

Figure 3:
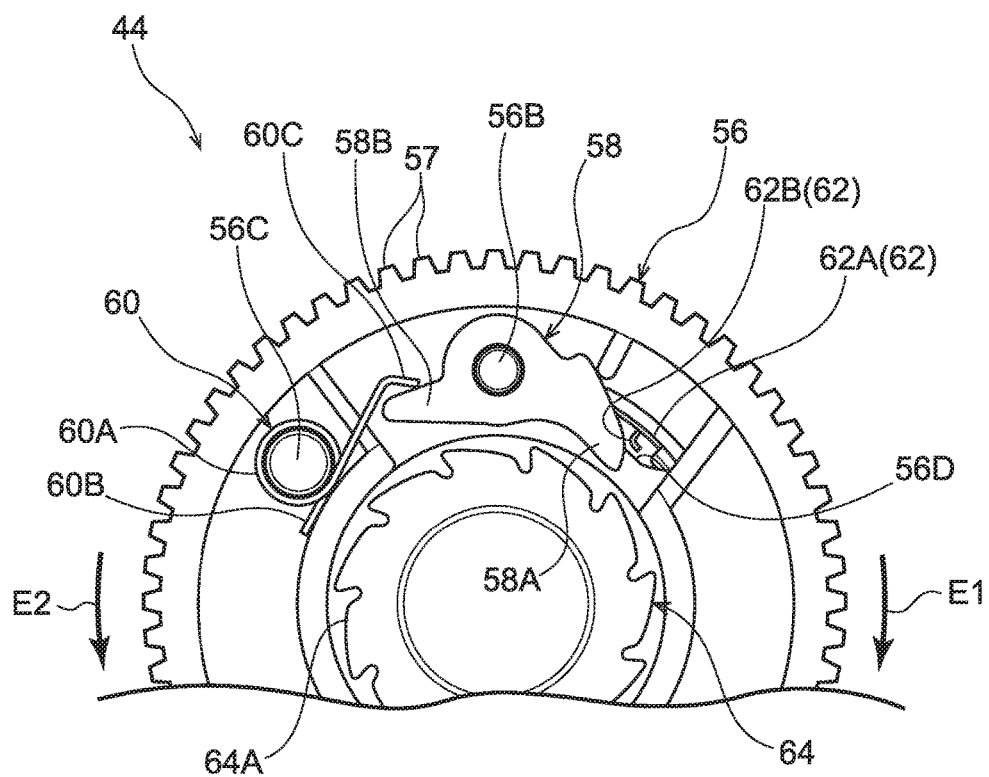
FIG. 3 is a side view corresponding to FIG. 2 of the first clutch as viewed from the side of the leg piece of the frame, illustrating a state in which the lock bar is not engaged with the ratchet.

As illustrated in FIG. 1, the friction spring 62 is provided between the clutch gear 56 and the gear housing 52. The friction spring 62 includes a sliding contact portion 62A that makes sliding contact with the gear housing 52 when the clutch gear 56 is rotated, and a pressing portion 62B that extends out from the sliding contact portion 62A toward the clutch gear 56 side, and is inserted through the friction spring insertion hole 56D formed in the clutch gear 56. As illustrated in FIG. 2, when the clutch gear 56 is rotated toward one axial direction side (the arrow E1 direction side), the pressing portion 62B of the friction spring 62 presses the ratchet engagement portion 58A of the lock bar 58. Moreover, when force input to the ratchet engagement portion 58A of the lock bar 58 from the pressing portion 62B of the friction spring 62 exceeds the urging force of the return spring 60, the lock bar 58 is tilt-moved, and the ratchet engagement portion 58A of the lock bar 58 engages with the ratchet 64. Rotation force input to the clutch gear 56 is thereby input to the ratchet 64 through the lock bar 58, and the spool 20 is rotated in the take-up direction together with the ratchet 64. Conversely, as illustrated in FIG. 3, when the clutch gear 56 is rotated toward another axial direction side (the arrow E2 direction side), force input to the ratchet engagement portion 58A of the lock bar 58 from the pressing portion 62B of the friction spring 62 does not exceed the urging force of the return spring 60, and so the ratchet engagement portion 58A of the lock bar 58 does not engage with the ratchet 64. Accordingly, the rotation force input to the clutch gear 56 is not input to the ratchet 64 through the lock bar 58.

The ratchet 64 is formed in a circular disk shape. Plural engaged-with outer teeth 64A that engage with the ratchet engagement portion 58A of the lock bar 58 are formed to an outer peripheral portion of the ratchet 64. As illustrated in FIG. 1, the ratchet 64 is fixed to the support shaft portion 29 of the spool 20 by press-fitting or the like.

The B-gear 46 includes a large diameter portion 46T formed with plural outer teeth 47T at an outer peripheral portion that mesh together with the outer teeth 41 of the A-gear 40, and a small diameter portion 46S disposed coaxially to the large diameter portion 46T and integrally formed to the large diameter portion 46T. An external diameter of the small diameter portion 46S is set smaller than an external diameter of the large diameter portion 46T, and an outer peripheral portion of the small diameter portion 46S is formed with plural outer teeth 47S that mesh together with the OL-gear 48, described below.

Figure 4:
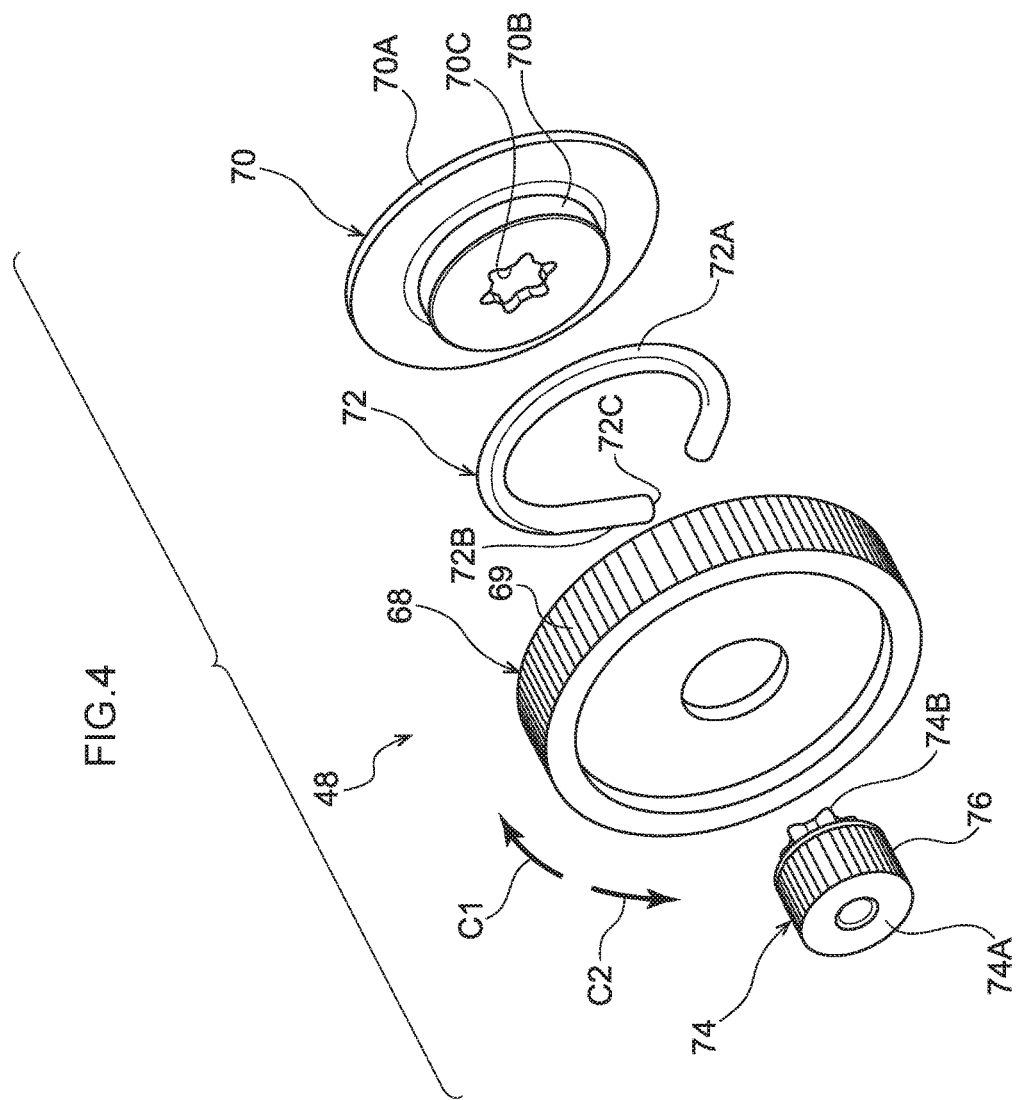
FIG. 4 is an exploded perspective view illustrating an OL-gear.

As illustrated in FIG. 4, the OL-gear 48 is configured including an input gear 68 that is rotated by rotation force transmitted from the B-gear 46 (see FIG. 1), a rotor 70 that is disposed coaxially to the input gear 68, a clutch spring 72 that is provided between the input gear 68 and the rotor 70, and an output gear 74 that is engaged with the rotor 70 so as to be capable of rotating integrally with the rotor 70.

Figure 5:
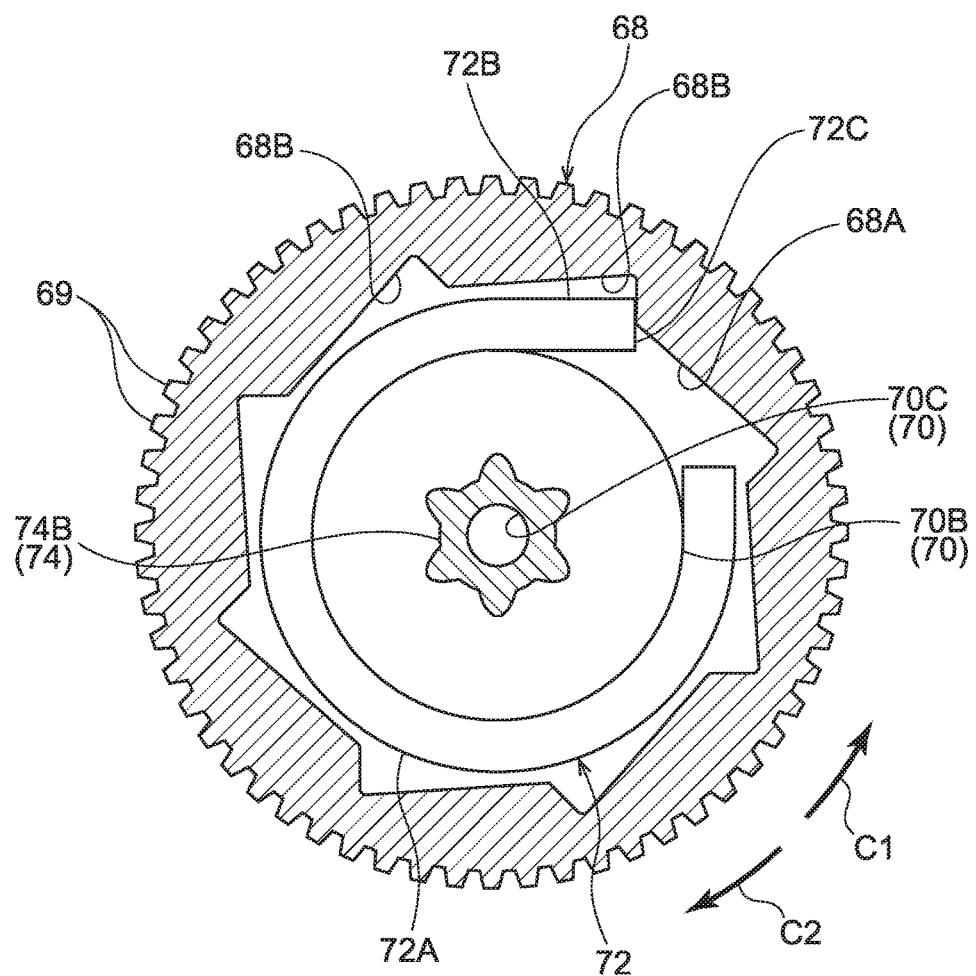
FIG. 5 is a cross-section taken along a radial direction of an OL-gear.

The input gear 68 is formed in a circular disk shape. Plural outer teeth 69 that mesh together with the outer teeth 47S formed to the small diameter portion 46S of the B-gear 46 are formed at an outer peripheral portion of the input gear 68. As illustrated in FIG. 5, the input gear 68 is formed with a indentation portion 68A opening toward the rotor 70 side and in which the clutch spring 72 and a wound-onto portion 70B of the rotor 70, described later, are disposed. Plural clutch spring engagement recesses 68B are formed around the circumferential direction of the input gear 68 at locations at the input gear 68 radial direction outside of the indentation portion 68A.

As illustrated in FIG. 4, the rotor 70 includes a circular disk portion 70A formed in a circular disk shape, and the wound-onto portion 70B formed in a circular column shape extending out from a location at the radial direction inside of the circular disk portion 70A toward the input gear 68 side. An axial center portion of the rotor 70, namely an axial center portion of the wound-onto portion 70B, is formed with a spline shaped engagement hole 70C that engages with the output gear 74.

The clutch spring 72 includes a curved portion 72A that curves in a ring shape. In a state prior to attaching the clutch spring 72 to the wound-onto portion 70B of the rotor 70, an internal diameter of the curved portion 72A is a slightly smaller diameter than the external diameter of the wound-onto portion 70B of the rotor 70. The curved portion 72A is placed in pressing contact with the wound-onto portion 70B of the rotor 70 by enlarging the internal diameter of the curved portion 72A and engaging the curved portion 72A with an outer peripheral face of the wound-onto portion 70B of the rotor 70. As illustrated in FIG. 5, one end portion of the clutch spring 72 configures an engagement portion 72B that engages with the clutch spring engagement recesses 68B of the input gear 68. When the input gear 68 is rotated toward one side (toward the arrow C1 direction), a portion of a clutch spring engagement recess 68B of the input gear 68 presses an end 72C of the engagement portion 72B. Rotation force input to the input gear 68 is thereby transmitted to the rotor 70 and the output gear 74 through the clutch spring 72. Conversely, when rotation force in a direction to rotate the input gear 68 toward another side (toward the arrow C2 direction) acts on the input gear 68, another portion of the clutch spring engagement recess 68B of the input gear 68 presses the engagement portion 72B of the clutch spring 72 toward the side of the wound-onto portion 70B of the rotor 70. The engagement between the engagement portion 72B of the clutch spring 72 and the clutch spring engagement recess 68B accordingly becomes shallower. When rotation force toward the arrow C4 direction acting on the input gear 68 exceeds a specific value, the engagement between the engagement portion 72B of the clutch spring 72 and the clutch spring engagement recesses 68B is released. As a result, the OL-gear 48 does not transmit rotation force toward the arrow C2 direction above a specific value. Tension arising in the webbing during pre-tensioning, described later, is thereby suppressed from reaching a specific value or greater.

The output gear 74 includes an output gear main body portion 74A, formed with plural outer teeth 76 at an outer peripheral portion that mesh together with the C-gear 50, and a spline shaped engagement portion 74B that is integrally formed to the output gear main body portion 74A and that is engaged with the engagement hole 70C formed in the rotor 70. The output gear 74 and the rotor 70 are coupled so as to be capable of rotating together integrally due to engaging the engagement portion 74B of the output gear 74 together with the engagement hole 70C formed in the rotor 70.

As illustrated in FIG. 1, the C-gear 50 is formed in a circular disk shape that is formed with plural outer teeth 51 that mesh together with the outer teeth 76 (see FIG. 4) of the output gear 74 configuring part of the OL-gear 48, and with the outer teeth 57 of the clutch gear 56 configuring part of the first clutch 44. The C-gear 50 rotates the clutch gear 56 due to the C-gear 50 being rotated by the output gear 74 of the OL-gear 48.

The B-gear 46, the OL-gear 48, and the C-gear 50 described above are rotatably supported on shaft portions standing out inside a housing recess 52A formed to the gear housing 52, in a state housed inside the housing recess 52A.

A spring holder 84, on which an idle gear 78, a spool gear 80, a retractor spring 82, and a second clutch 116 are supported, is fixed to the gear housing 52.

The idle gear 78 is formed in a circular disk shape. Plural outer teeth 79 that mesh together with the spool gear 80 and the second clutch 116, described later, are formed at an outer peripheral portion of the idle gear 78. The idle gear 78 is rotatably supported on a shaft portion standing out inside a housing recess formed to a location on the gear housing 52 side of the spring holder 84, in a state housed inside the housing recess. A second seat 86 is attached to the spring holder 84, thereby restricting movement of the idle gear 78 toward the gear housing 52 side.

The spool gear 80, serving as a second rotating body, is formed in a circular disk shape set with a larger diameter than the idle gear 78. Plural outer teeth 81 that mesh together with the outer teeth 79 of the idle gear 78 are formed at an outer peripheral portion of the spool gear 80. An adaptor fixing portion 80A is formed projecting out toward the retractor spring 82 side at an axial center portion of the spool gear 80. An engagement hole, not illustrated in the drawings, with which the support shaft portion 29 of the spool 20 engages, is formed at a location on the spool 20 side of the axial center portion of the spool gear 80. The engagement hole of the spool gear 80 is engaged with the support shaft portion 29 of the spool 20, thereby coupling the spool gear 80 and the spool 20 so as to be capable of rotating together integrally. The spool gear 80 is housed inside a housing recess formed at a location on the gear housing 52 side of the spring holder 84. In a housed state of the spool gear 80 inside the housing recess, the adaptor fixing portion 80A of the spool gear 80 projects out toward the retractor spring 82 side through an insertion hole 84A formed in a bottom wall of the housing recess.

The retractor spring 82 is formed in a spiral shape, and the retractor spring 82 is housed inside a spring housing portion 84B formed to the spring holder 84 on the opposite side to the side where the spool gear 80 is housed. An inner end portion of the retractor spring 82 is caught at an adaptor 88 that is fixed to the adaptor fixing portion 80A of the spool gear 80. An outer end portion of the retractor spring 82 is caught at a catch portion, not illustrated in the drawings, formed inside the spring housing portion 84B. Urging force of the retractor spring 82 is transmitted to the spool 20 through the adaptor 88 and the spool gear 80, such that the spool 20 is rotation-urged toward the take-up direction. Note that (a take-up force in the webbing due to) the urging force of the retractor spring 82 is set so as to be comparatively weak, at a level that eliminates slack in the webbing when worn by an occupant. In other words, the urging force of the retractor spring 82 is set at a strength that does not constrict the occupant in a state wearing the webbing, and does not require enough strength to completely take up the webbing pulled out from the spool 20 against friction and the like acting on the webbing.

A spring cover 90 is attached to the spring holder 84. The retractor spring 82 housed inside the spring housing portion 84B is thereby covered by the spring cover 90.

Figure 6:
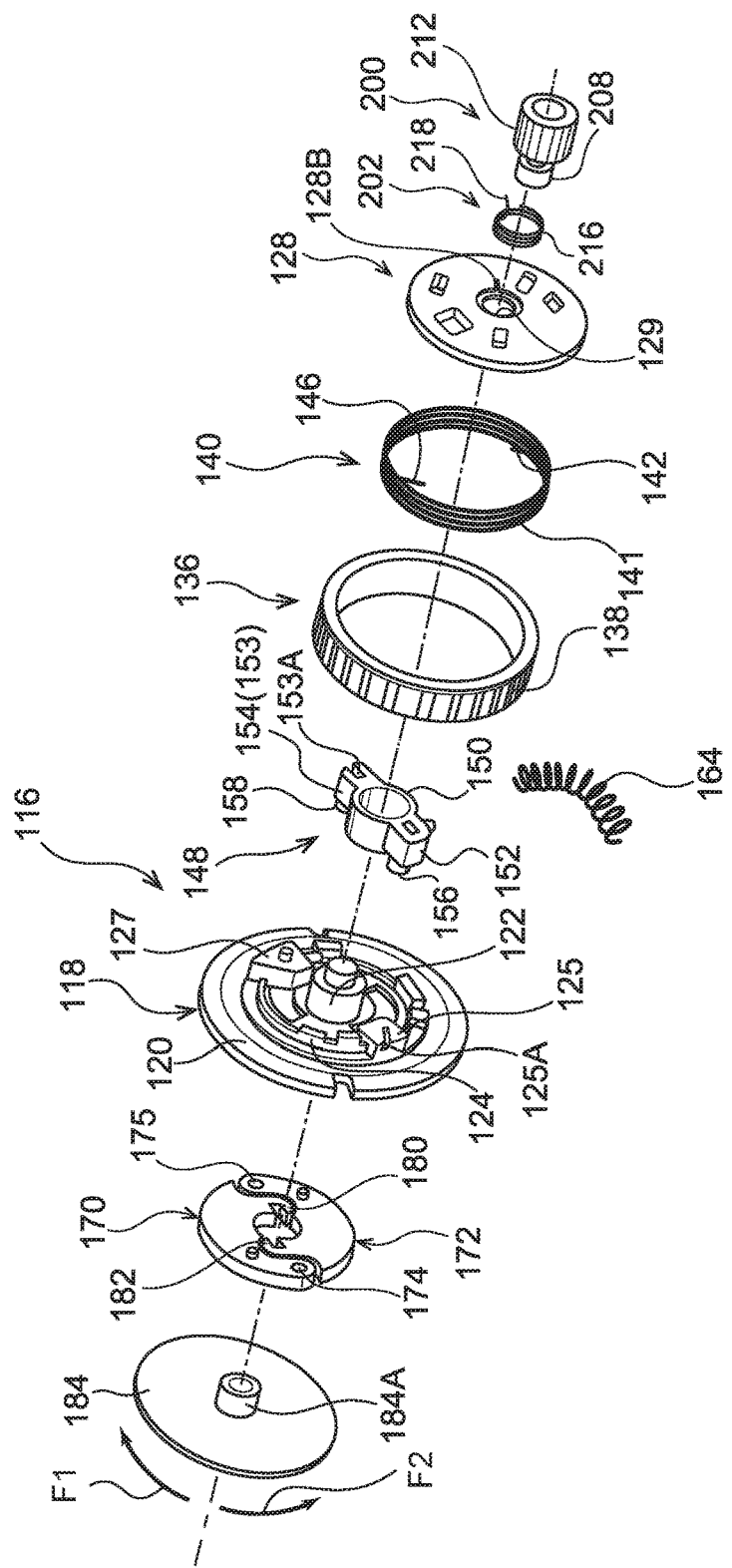
FIG. 6 is an exploded perspective view illustrating a second clutch.
Figure 7:
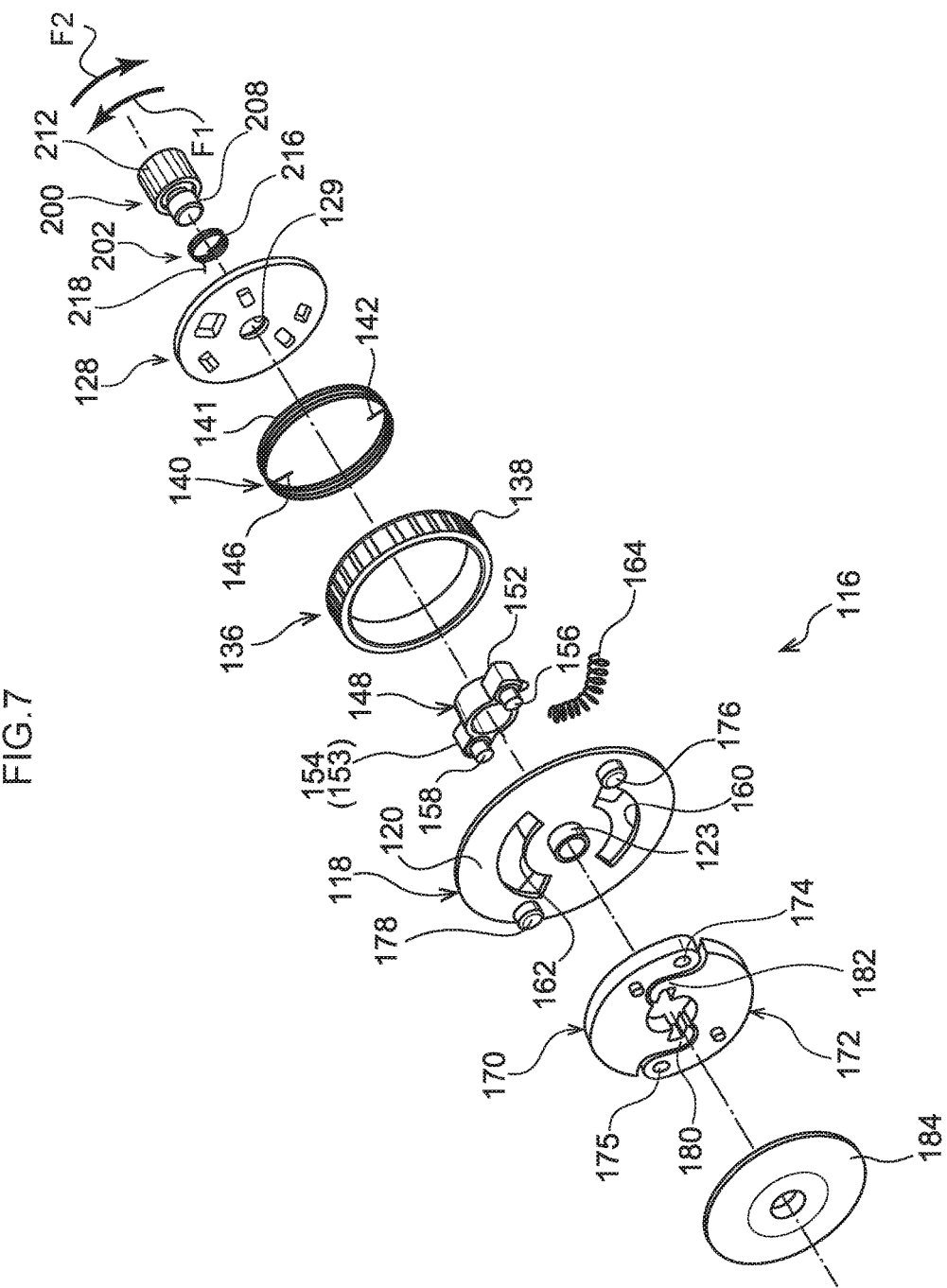
FIG. 7 is an exploded perspective view illustrating a second clutch, as viewed from the opposite side to FIG. 6.

FIG. 6 and FIG. 7 are exploded perspective views illustrating configuration of the second clutch 116, serving as a clutch. FIG. 8 illustrates configuration of the second clutch 116 in cross-section. As illustrated in FIG. 6 to FIG. 8, the second clutch 116 includes a base 118, and a rotor plate 128 that is attached to the base 118 so as to rotate integrally together with the base 118. The second clutch 116 also includes a clutch gear 136, a clutch spring 140 provided between the base 118 and the clutch gear 136, and a lever 148 rotatably supported by the base 118. The second clutch 116 also includes a pair of clutch weights 170, 172 supported by the base 118, and a spacer 184 attached to the base 118.

The base 118 includes a circular disk portion 120 formed in a circular disk shape, a circular column shaped support shaft portion 122 projecting toward one axial direction side of the circular disk portion 120 at an axial center portion of the circular disk portion 120, and a side wall portion 124 with a substantially C-shaped cross-section formed coaxially around the support shaft portion 122. The base 118 also includes a block shaped first spring catch portion 125 formed with a first spring catch groove 125A to which an end portion of one side of the clutch spring 140 is caught, and that projects out in the same direction as the projection direction of the support shaft portion 122. A radial direction outside face of the first spring catch portion 125 is formed with a circular cylinder face shape with the same radius of curvature as an outer peripheral face of the side wall portion 124.

Figure 9A:
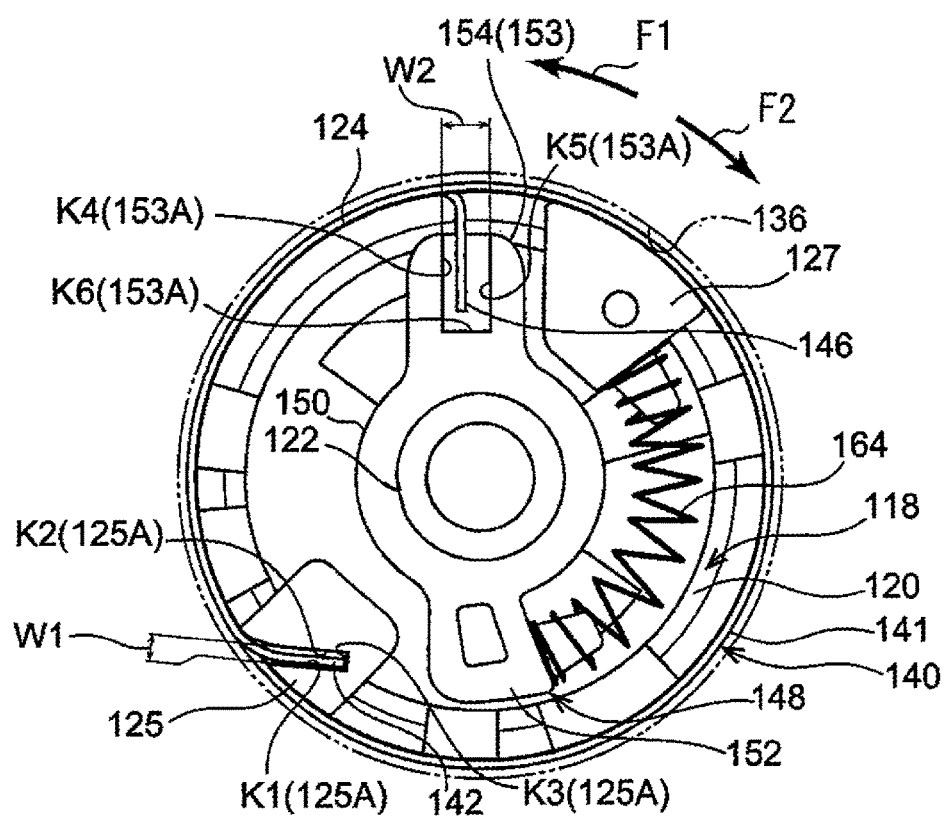
FIGS. 9A and 9B illustrate a partial configuration of a second clutch.

As illustrated in FIG. 9A, the first spring catch groove 125A formed in the first spring catch portion 125 is formed in a groove shape opening at the radial direction outside and on one axial direction side (the rotor plate 128 side) of the base 118. The first spring catch groove 125A is configured including side wall portions K1, K2 disposed parallel to each other across a space, and a bottom wall portion K3 forming a terminal face in a depth direction of the first spring catch groove 125A. As viewed along the axial direction of the base 118, the side wall portions K1, K2 are inclined toward the radial direction inside of the base 118 on progression toward another (arrow F1 direction) side about the axis of the base 118. A groove width W1 of the first spring catch groove 125A, namely a clearance between the side wall portion K1 and the side wall portion K2, is set as a width slightly larger than the wire diameter of a first catch portion 142 of the clutch spring 140, described later. Note that an open end of the first spring catch groove 125A on the one axial direction side of the base 118 is closed off by the rotor plate 128, described later.

As illustrated in FIG. 6 and FIG. 7, the base 118 includes a circular cylinder shaped support shaft portion 123 projecting toward the opposite side of the circular disk portion 120 to the side provided with the support shaft portion 122. The circular disk portion 120 of the base 118 also includes support shafts 176, 178 projecting out toward the side of the clutch weights 170, 172 at the radial direction outside of the support shaft portion 123. The support shafts 176, 178 are disposed at uniform intervals around the circumferential direction of the base 118. A pair of elongated holes 160, 162 are formed around the circumferential direction of the base 118 at locations at the radial direction outside of the support shaft portions 122, 123 on the circular disk portion 120 of the base 118. Coupling projections 156, 158 of the lever 148, described later, engage with the elongated holes 160, 162, and the coupling projections 156, 158 are capable of moving about the circumferential direction of the circular disk portion 120 within the respective elongated holes 160, 162. A catch wall 127 that abuts one end portion of a return spring 164, described later, stands out from the circular disk portion 120.

As illustrated in FIG. 8, the base 118 described above is disposed inside a housing recess 84C formed in the spring holder 84, and is rotatably supported by a shaft portion 84D standing out in the housing recess 84C.

As illustrated in FIG. 6 and FIG. 7, the rotor plate 128 formed in a circular disk shape is provided on one axial direction end side (the right side in FIG. 6 and FIG. 7) of the support shaft portion 122 of the base 118. The rotor plate 128 is engaged with a claw provided to the side wall portion 124 of the base 118 such that the rotor plate 128 is fixed so as to be capable of rotating integrally together with the base 118. A circular shaft support hole 129 is formed at an axial center portion of the rotor plate 128, and an input gear 200, described later, is rotatably supported by the shaft support hole 129. The rotor plate 128 is rotated, namely the second clutch 116 is rotated, by inputting rotation force of the input gear 200, described later, to the rotor plate 128 through a sub clutch spring 202.

The clutch gear 136 is provided coaxially to, and capable of rotating relative to, the base 118 at the radial direction outside of the side wall portion 124 of the base 118. Plural outer teeth 138 are formed on an outer peripheral portion of the clutch gear 136. The outer teeth 138 mesh together with the outer teeth 79 (see FIG. 1) of the idle gear 78 described above. An internal diameter dimension of the clutch gear 136 is sufficiently larger than an external diameter dimension of the side wall portion 124 of the base 118, and a ring shaped gap is formed between an inner peripheral face of the clutch gear 136 and the outer peripheral face of the side wall portion 124. The clutch spring 140, configured by a torsion coil spring, is disposed coaxially in the ring shaped gap.

The clutch spring 140 includes a coil portion 141 that is wound into a ring shape between the outer peripheral face of the side wall portion 124 of the base 118, and the inner peripheral face of the clutch gear 136. An end portion on the one side of the clutch spring 140 is bent toward the radial direction inside of the coil portion 141 to configure the first catch portion 142. As illustrated in FIG. 9A, the first catch portion 142 has an incline with respect to the radial direction of the coil portion 141 corresponding to that of the first spring catch groove 125A described above. An end portion on another side of the clutch spring 140 is bent toward the radial direction inside of the coil portion 141 to configure a second catch portion 146. The second catch portion 146 extends along the radial direction of the coil portion 141 corresponding to a second spring catch groove 153A formed in the lever 148, described later. The first catch portion 142 and the second catch portion 146 are disposed at a specific spacing to each other around the circumferential direction of the coil portion 141. An internal diameter dimension of the coil portion 141 in a natural state is set as a smaller dimension than an external diameter dimension of the side wall portion 124 of the base 118. The coil portion 141 is accordingly urged in a direction to decrease the diameter under its own elastic force when the coil portion 141 is assembled the side wall portion 124 of the base 118. The coil portion 141 is accordingly in close contact with the outer peripheral face of the side wall portion 124 of the base 118 in an assembled state of the coil portion 141 to the side wall portion 124 of the base 118. A clearance is provided between the coil portion 141 and the inner peripheral face of the clutch gear 136 in the assembled state of the coil portion 141 to the side wall portion 124 of the base 118.

The first catch portion 142 of the clutch spring 140 is fitted into and caught by the first spring catch groove 125A formed in the first spring catch portion 125 of the base 118. Moreover, the second catch portion 146 of the clutch spring 140 is fitted into and caught by the second spring catch groove 153A formed in a second spring catch portion 153 of the lever 148, described later.

The lever 148 includes a circular cylinder shaped shaft receiving portion 150. The support shaft portion 122 of the base 118 passes through the inside the tube of the shaft receiving portion 150, thereby supporting the lever 148 so as to be capable of rotating relative to the support shaft portion 122 (base 118) about the axis of the support shaft portion 122. An outer peripheral portion of the shaft receiving portion 150 is provided with a coupling portion 152 and a coupling portion 154 in a pair projecting out along the radial direction at opposite sides to each other around the circumferential direction (opposite sides at 180° to each other).

As illustrated in FIG. 7, the circular column shaped coupling projection 156 and coupling projection 158 are provided projecting out from the pair of respective coupling portions 152, 154 toward the circular disk portion 120 side of the base 118. The coupling projections 156, 158 respectively engage with engagement pawls 180, 182 provided to the pair of the clutch weight 170 and the clutch weight 172, described later.

Figure 9B:
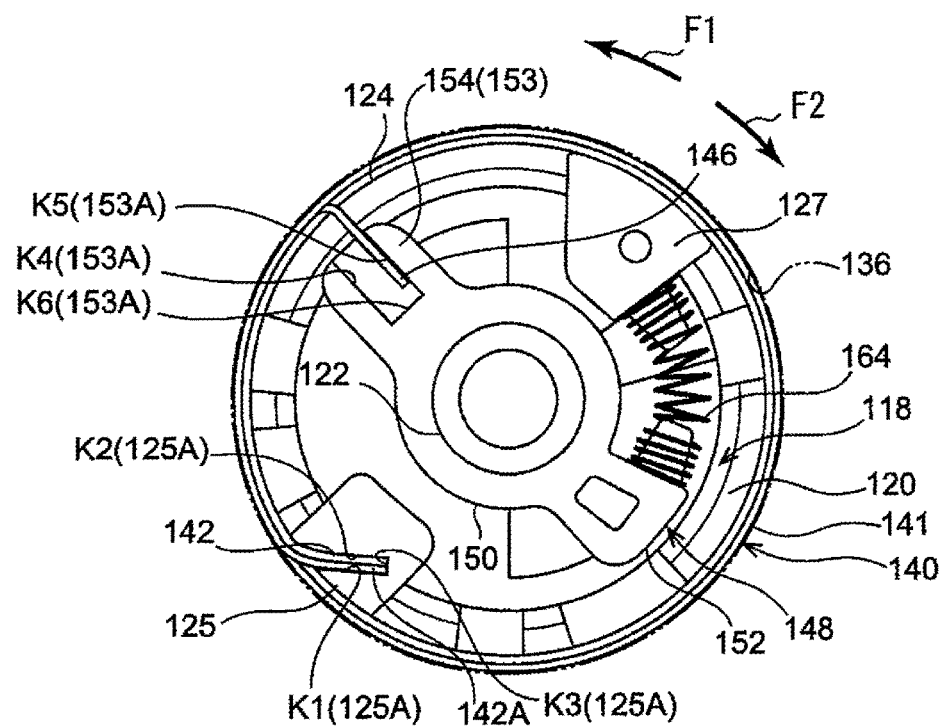

As illustrated in FIG. 9A and FIG. 9B, the one coupling portion 152 of the lever 148 is abutted by one end portion of the return spring 164, this being a torsion coil spring. Another end portion of the return spring 164 abuts the catch wall 127 standing out from the circular disk portion 120 of the base 118. The return spring 164 places the lever 148 under a constant urge in one direction about the axis of the base 118 (the arrow F2 direction). The pair of coupling projections 156, 158 of the lever 148 are normally retained in a state abutting one length direction end portion (arrow F2 direction side end portions in FIG. 5 and FIG. 6) of each of the pair of elongated holes 160, 162 of the circular disk portion 120.

As illustrated in FIG. 9A, the other coupling portion 154 of the lever 148 is configured as the second spring catch portion 153 to which the second catch portion 146 of the clutch spring 140 is caught. The second spring catch portion 153 is formed with the second spring catch groove 153A into which the second catch portion 146 of the clutch spring 140 is fitted. Accordingly, as illustrated in FIG. 9A and FIG. 9B, when the lever 148 rotates toward the another direction about the axis (the arrow F1 direction) with respect to the base 118 against the elastic force of the return spring 164, the second catch portion 146 of the clutch spring 140 is moved toward one winding direction of the clutch spring 140 (the arrow F1 direction), enlarging the external diameter dimension of the coil portion 141 of the clutch spring 140. The second spring catch groove 153A is configured including side wall portions K4, K5 and a bottom wall portion K6, similarly to the first spring catch groove 125A described above. In the present exemplary embodiment, in a state in which the lever 148 is supported by the base 118, the side wall portions K4, K5 are substantially parallel to the radial direction of the base 118. A groove width W2 of the second spring catch groove 153A, namely a clearance between the side wall portion K4 and the side wall portion K5, is set as a width sufficiently wider than the wire diameter of the second catch portion 146 of the clutch spring 140. The clutch spring 140 accordingly has good ease of assembly to the base 118 and the lever 148.

Moreover, when the external diameter dimension of the coil portion 141 of the clutch spring 140 is enlarged in this manner, the coil portion 141 of the clutch spring 140 presses against the inner peripheral face of the clutch gear 136. In this state, a specific frictional force arises between an outer peripheral portion of the clutch spring 140 and the inner peripheral face of the clutch gear 136, such that the frictional force couples the clutch spring 140 and the clutch gear 136 integrally to one another.

As illustrated in FIG. 6 to FIG. 8, the pair of the clutch weight 170 and the clutch weight 172 that are respectively formed in substantially semicircular plate shapes are disposed on another axial direction side of the base 118 (the opposite side to the rotor plate 128). The pair of clutch weights 170, 172 are set with the same weight as each other, and are provided on opposite sides to each other around the circumferential direction of the circular disk portion 120 (on opposite sides at 180 degrees to each other). Circular shaft receiving holes 174, 175 are formed at one circumferential direction sides of the pair of clutch weights 170, 172. The circular column shaped support shaft 176 and support shaft 178 projecting out from the circular disk portion 120 of the base 118 fit rotatably into the respective shaft receiving holes 174, 175. The respective clutch weights 170, 172 are thereby supported by the base 118 so as to be capable of rotating (capable of tilt moving) about the respective support shafts 176, 178 (shaft receiving holes 174, 175) in the radial direction of the base 118.

The one clutch weight 170 includes the substantially U-shaped engagement pawl 180 that engages with the coupling projection 158 of the lever 148 described above. The other clutch weight 172 likewise includes the substantially U-shaped engagement pawl 182 that engages with the coupling projection 156 of the lever 148. The pair of the clutch weight 170 and the clutch weight 172 are thereby synchronized (interlocked) through the lever 148, and are normally retained at the radial direction inside of the base 118 under the urging force of the return spring 164 acting on the lever 148.

As illustrated in FIG. 6 to FIG. 8, the circular disk shaped spacer 184 is disposed on the opposite side of the pair of clutch weights 170, 172 to the base 118. A tube shaped boss portion 184A that fits together with an outer peripheral portion of the support shaft portion 123 of the base 118 stands out from a central portion of the spacer 184. The spacer 184 suppresses the pair of clutch weights 170, 172 from falling off the base 118, and also suppresses the pair of the clutch weight 170 and the clutch weight 172 from interfering on a bottom wall of the housing recess 84C of the spring holder 84.

Note that in the second clutch 116 of the present exemplary embodiment, when the rotor plate 128 rotates toward the another direction about its axis (the arrow F1 direction in FIG. 6 and FIG. 7), the base 118 that is coupled integrally to the rotor plate 128 rotates toward the another direction about its axis together with the rotor plate 128. Accordingly, the pair of the clutch weight 170 and the clutch weight 172 supported by the base 118 rotate about the axis of the base 118 following the base 118. When this occurs, centrifugal force acts on the pair of the clutch weight 170 and the clutch weight 172, such that rotation torque acts on the clutch weight 170 about the support shaft 176, and rotation torque acts on the clutch weight 172 about the support shaft 178.

Accordingly, when the magnitudes of the rotation torques are at a specific value or greater, namely, when the rotation speeds of the clutch weight 170 and the clutch weight 172 are at a specific value or greater, the pair of the clutch weight 170 and the clutch weight 172 respectively rotate about the support shaft 176 or the support shaft 178 toward the radial direction outside of the base 118 against the urging force of the return spring 164 acting on the lever 148. Accordingly, configuration is made such that the lever 148, in which the coupling projection 158 is engaged with the engagement pawl 180 of the clutch weight 170, and the coupling projection 156 is engaged with the engagement pawl 182 of the clutch weight 172, rotates toward the another direction about the axis with respect to the base 118 (the arrow F1 direction in FIG. 9A and FIG. 9B).

In the present exemplary embodiment, configuration is made such that rotation force of the output shaft of the motor 38 is transmitted to the rotor plate 128 through the A-gear 40, the B-gear 46, the OL-gear 48, the input gear 200, serving as a first rotating body, and the sub clutch spring 202 serving as a sub clutch.

Figure 10:
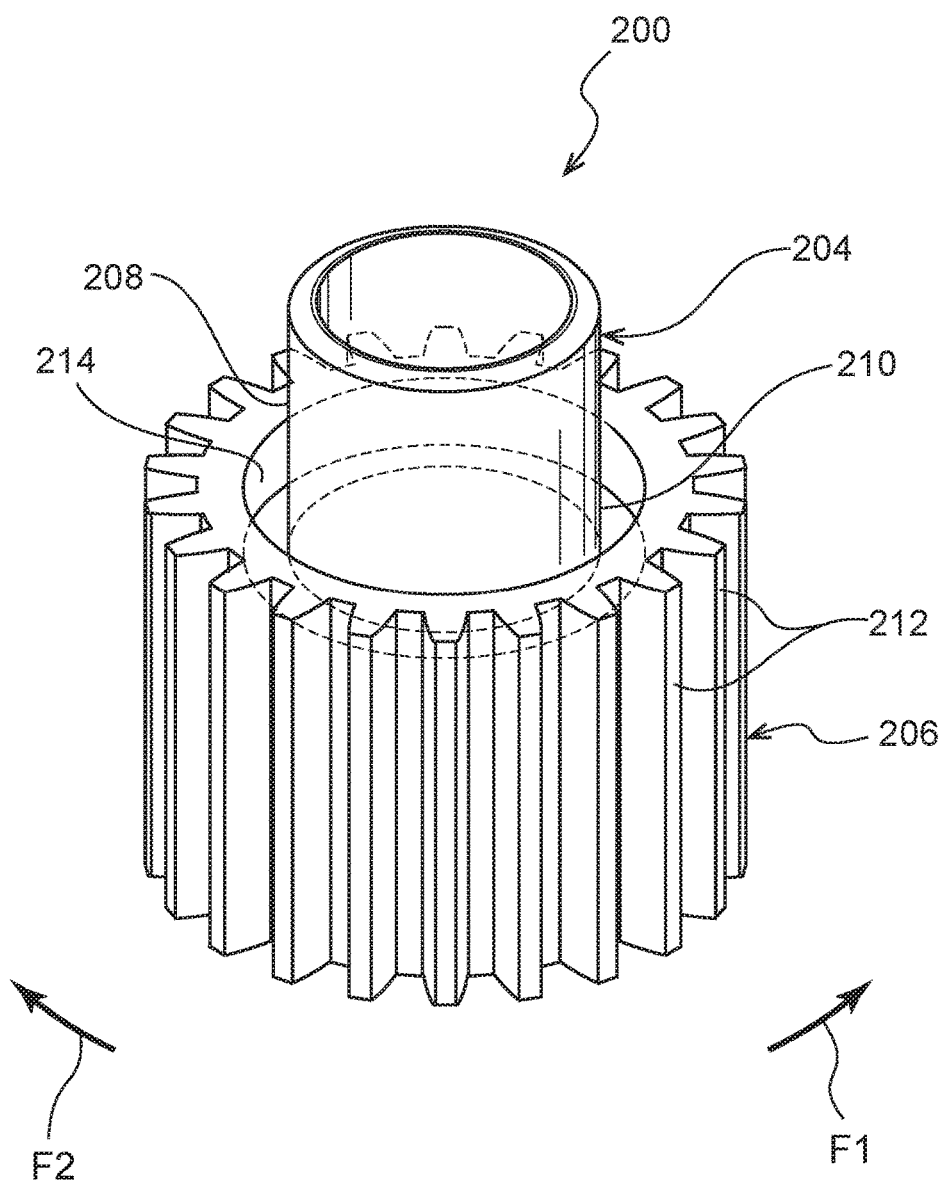
FIG. 10 is an enlarged perspective view illustrating an input gear.

As illustrated in FIG. 10, the input gear 200 is configured including a shaft portion 204 that is rotatably supported by the shaft support hole 129 (see FIG. 6) of the rotor plate 128, and a gear portion 206 that is integrally provided to the shaft portion 204. The shaft portion 204 is formed in a substantially circular cylinder shape, and an end portion which is on the rotor plate 128 side of the shaft portion 204 configures an engagement portion 208 that engages with the shaft support hole 129 of the rotor plate 128. A portion of the shaft portion 204, which is on the opposite side to the rotor plate 128, configures a sub clutch spring setting portion 210 where the sub clutch spring 202 (see FIG. 6) is disposed around an outer peripheral face thereof. By the sub clutch spring 202, described later, being placed in pressing contact with the sub clutch spring setting portion 210, the input gear 200 and the sub clutch spring 202 rotate together integrally. The gear portion 206 is provided at an end portion on one side of the shaft portion 204, and an outer peripheral portion of the gear portion 206 is formed with outer teeth 212 of a spur gear. The outer teeth 212 mesh together with the outer teeth 69 (see FIG. 4) of the input gear 68 configuring part of the OL-gear 48, described above. A radial direction inside of an end portion on the rotor plate 128 (see FIG. 7) side of the gear portion 206 is formed with a housing recess 214 in which part of the sub clutch spring 202, described later, is disposed.

Figure 11:
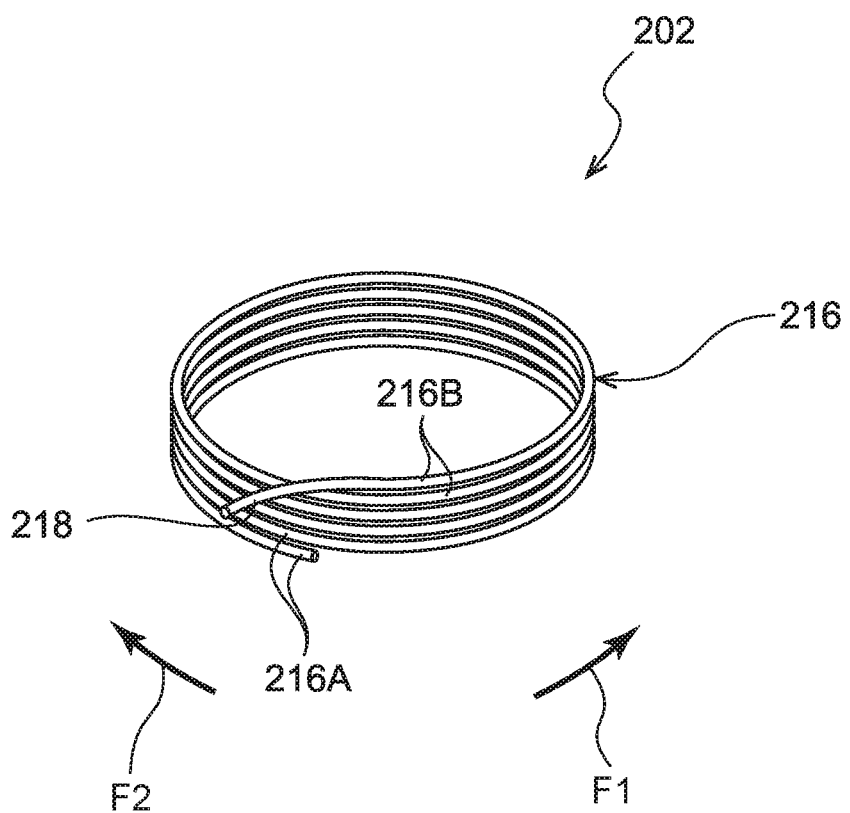
FIG. 11 is an enlarged perspective view illustrating a sub clutch spring.
Figure 12:
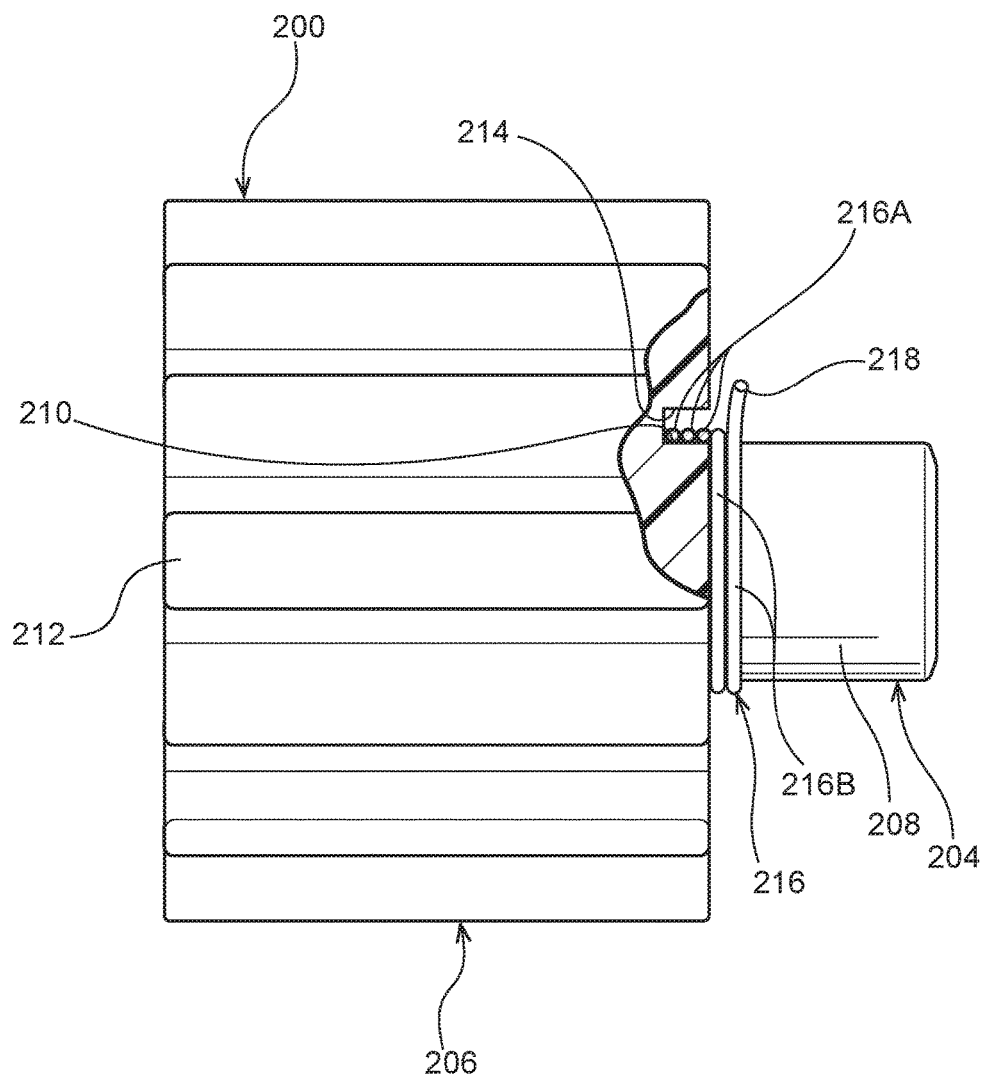
FIG. 12 is an enlarged side view illustrating an assembled state of a sub clutch spring to an input gear.

As illustrated in FIG. 6, the sub clutch spring 202 is provided between the input gear 200 and the rotor plate 128. The sub clutch spring 202 is formed by, for example, bending (bending process and the like being performed on) a wire shaped member. As illustrated in FIG. 11, the sub clutch spring 202 includes a coil portion 216 that is wound in a ring shape around an outer peripheral face of the sub clutch spring setting portion 210 (see FIG. 10) of the input gear 200 (wound (coiled) about the axis of rotation of the input gear 200 as a center). An end portion of the sub clutch spring 202, which is on the rotor plate 128 (see FIG. 6) side, configures a catch portion 218 that is bent toward the radial direction outside of the coil portion 216. The coil portion 216 is formed by winding (coiling) a wire shaped member into a spiral shape toward the another side about its axis (in the arrow F1 direction) as viewed from the opposite side of the coil portion 216 to the side where the catch portion 218 is formed. In a natural state, an internal diameter dimension of the coil portion 216 is set as a smaller dimension than, or the same dimension as, an external diameter dimension of the sub clutch spring setting portion 210. Accordingly, as illustrated in FIG. 12, in an assembled state of the sub clutch spring 202 to the sub clutch spring setting portion 210, the coil portion 216 abuts the outer peripheral face of the sub clutch spring setting portion 210. Moreover, in the assembled state of the sub clutch spring 202 to the sub clutch spring setting portion 210, a portion 216A of the coil portion 216, which is on the opposite side to the side where the catch portion 218 is provided, is disposed inside the housing recess 214 formed at the gear portion 206 of the input gear 200. A portion 216B of the coil portion 216, where the catch portion 218 is provided, is disposed further to the rotor plate 128 side than an open end of the housing recess 214.

In the exemplary embodiment, the sub clutch spring 202 (the coil portion 216) is arranged, in the axis direction of the input gear 200, at both of the shaft portion 204 (on an outer peripheral face of the shaft portion 204) and the gear portion 206 (in the housing recess 214 which is at the radial direction inner side than the outer teeth 212).

Figure 13:
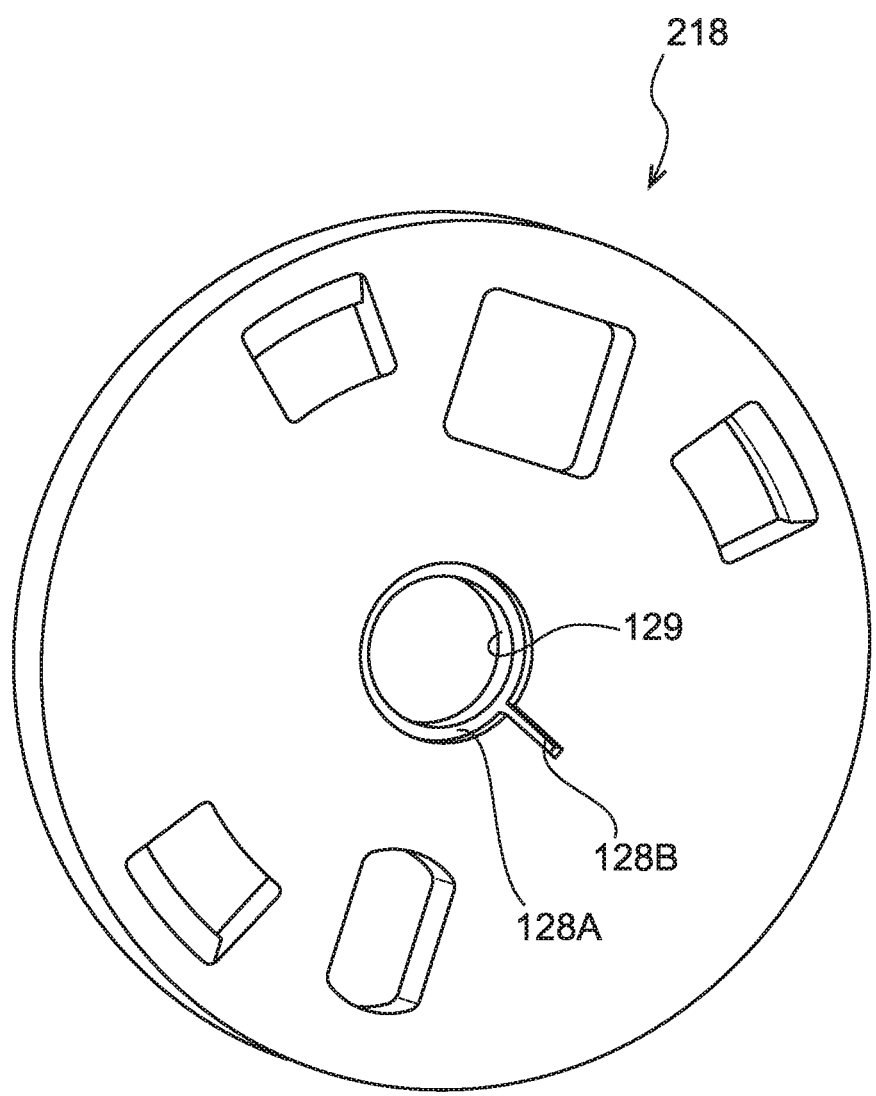
FIG. 13 is an enlarged perspective view illustrating a rotor plate.

As illustrated in FIG. 13, at an inner peripheral edge portion of the shaft support hole 129 of the rotor plate 128, a step portion 128A is formed where the portion 216B (see FIG. 12) of the coil portion 216 of the sub clutch spring 202, which is disposed further to the rotor plate 128 side than the open end of the housing recess 214 is disposed. At the rotor plate 128, a catch groove 128B is formed that is connected to the step portion 128A and to which the catch portion 218 (see FIG. 12) of the sub clutch spring 202 is caught.

As illustrated in FIG. 6, FIG. 11, and FIG. 12, when the input gear 200 is rotated toward the another side about its axis (in the arrow F2 direction), the external diameter of the coil portion 216 (diameter dimension of the coil portion 216 as its center being the axis of rotation of the input gear 200) decreases due to frictional force between the sub clutch spring setting portion 210 of the input gear 200 and the coil portion 216 of the sub clutch spring 202. The coil portion 216 accordingly closely contacts the sub clutch spring setting portion 210, such that the input gear 200 is rotated toward the another side about its axis (in the arrow F2 direction) together with the sub clutch spring 202. As a result, rotation force of the input gear 200 toward the another side about its axis (in the arrow F2 direction) is transmitted to the rotor plate 128 through the sub clutch spring 202, and the second clutch 116 is rotated toward the another side about its axis (in the arrow F2 direction).

When the input gear 200 is rotated toward the one side about its axis (in the arrow F1 direction), the external diameter of the coil portion 216 increases due to frictional force between the sub clutch spring setting portion 210 of the input gear 200 and the coil portion 216 of the sub clutch spring 202. The sub clutch spring setting portion 210 accordingly rotates idly (spins freely) with respect to the coil portion 216. As a result, the transmission of rotation force of the input gear 200 toward the one side about its axis (in the arrow F1 direction) to the rotor plate 128 is shut off (blocked), and the second clutch 116 is not rotated toward the one side about its axis (in the arrow F1 direction).

Operation and Advantageous Effects of the Present Exemplary Embodiment

Next, explanation follows regarding operation and advantageous effects of the present exemplary embodiment.

As illustrated in FIG. 1, in the webbing take-up device 10 configured as described above, in a stored state of the webbing taken up on the spool 20 in a layered shape, when the webbing is pulled while pulling on the tongue plate, not illustrated in the drawings, the webbing is pulled out while rotating the spool 20 in the pull-out direction, against the urging force of the retractor spring 82 that urges the spool 20 toward the take-up direction.

In a state in which the webbing has been pulled out, the webbing is worn over the body of the occupant by entraining the webbing around the front of the body of the occupant seated in a seat, inserting the tongue plate into a buckle device, and retaining the tongue plate in the buckle device.

Figure 14:
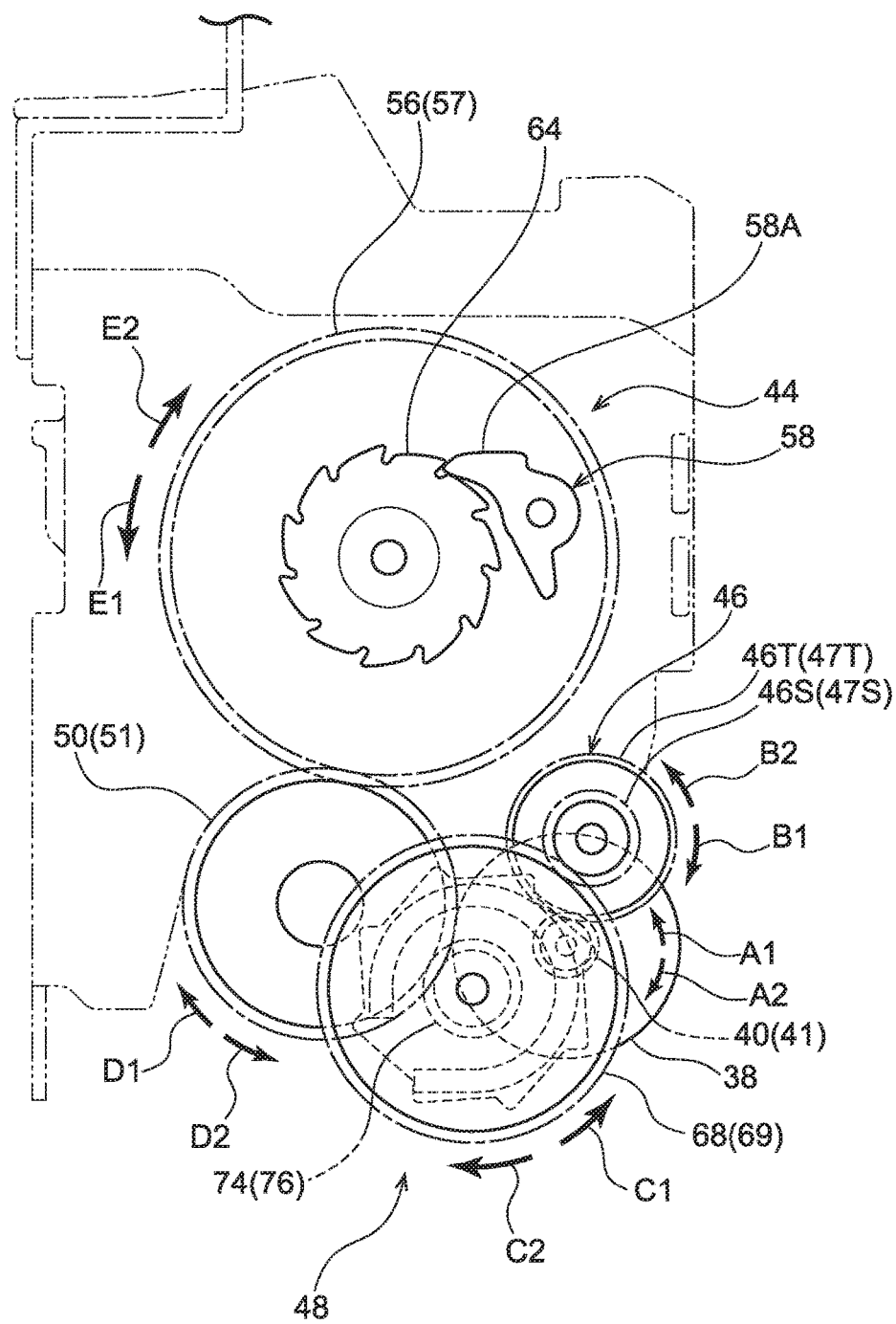
FIG. 14 is an explanatory diagram to explain a first transmission route of rotation of an output shaft of a motor during fitting assist and during pre-tensioning.

When insertion of the tongue plate into the buckle device has been detected by a switch or the like, not illustrated in the drawings, a motor controller, not illustrated in the drawings, rotates the output shaft of the motor 38 in a forward direction. Rotation of the output shaft of the motor 38 is transmitted to the spool 20 through a first transmission route, illustrated in FIG. 14. Specifically, the output shaft of the motor 38 rotates the A-gear 40 in the arrow A1 direction. When the A-gear 40 is rotated in the arrow A1 direction, the B-gear 46 is rotated in the arrow B1 direction by the A-gear 40, and the OL-gear 48 is rotated in the arrow C1 direction by the B-gear 46. The C-gear 50 is then rotated in the arrow D1 direction by the OL-gear 48, and the clutch gear 56 of the first clutch 44 is rotated in the arrow E1 direction by the C-gear 50. Note that when the clutch gear 56 is rotated in the arrow E1 direction, the lock bar 58 engages with the ratchet 64. As a result, the rotation of the clutch gear 56 is transmitted to the ratchet 64, and the spool 20 rotates in the take-up direction together with the ratchet 64. The webbing is thereby taken up onto the spool 20, and slack in the webbing worn by the occupant is removed (what is referred to as "fitting assist"). Then, in a state in which the output shaft of the motor 38 has stopped rotating, the webbing restrains the occupant with a relatively weak force due to the urging force of the retractor spring 82.

In a state in which the vehicle is travelling, when a detection device, not illustrated in the drawings, detects a sudden deceleration of the vehicle, for example, the motor controller, not illustrated in the drawings, rotates the output shaft of the motor 38 in the forward direction. When this is performed, the rotation force of the output shaft of the motor 38 is set higher than the rotation force during the fitting assist mentioned above. The rotation of the output shaft of the motor 38 in the forward direction is transmitted to the spool 20 through the first transmission route illustrated in FIG. 14, such that the webbing is taken up onto the spool 20, and slack in the webbing worn by the occupant is removed (what is referred to as "pre-tensioning").

When the occupant stops the vehicle and releases the tongue place from the buckle device, the spool 20 rotates in the take-up direction under the urging force of the retractor spring 82. However, since the urging force of the retractor spring 82 is set so as to be comparatively weak, the spool 20 rotates in the take-up direction with a comparatively weak rotation force, commensurate with the urging force of the retractor spring 82.

When this occurs, the motor controller, not illustrated in the drawings, rotates the output shaft of the motor 38 in a reverse direction. Rotation of the output shaft of the motor 38 is transmitted to the spool 20 through a second transmission route, illustrated in FIG. 15. Note that a speed reduction ratio of the second transmission route is set higher than a speed reduction ratio of the first transmission route described above.

When the output shaft of the motor 38 is rotated in the reverse direction, the output shaft of the motor 38 rotates the A-gear 40 in the arrow A2 direction. When the A-gear 40 is rotated in the arrow A2 direction, the B-gear 46 is rotated in the arrow B2 direction by the A-gear 40, and the OL-gear 48 is rotated in the arrow C2 direction by the B-gear 46. Then, the input gear 200 is rotated in the arrow F2 direction by the OL-gear 48. When this occurs, as illustrated in FIG. 6 to FIG. 8, the rotation force of the input gear 200 is transmitted to the rotor plate 128 of the second clutch 116 through the sub clutch spring 202, and the rotor plate 128 is rotated in the arrow F2 direction together with the base 118.

The rotation of the base 118 is transmitted to the clutch weight 170 through the support shaft 176 and the shaft receiving hole 174, and is transmitted to the clutch weight 172 through the support shaft 178 and the shaft receiving hole 175, such that the clutch weight 170 and the clutch weight 172 rotate about the axis of the base 118 following the base 118. Accordingly, centrifugal force acts on the clutch weight 170 and the clutch weight 172. As a result, the clutch weight 170 and the clutch weight 172 rotate (tilt-move) toward the radial direction outside of the base 118 about the support shafts 176, 178, against the urging force of the return spring 164 acting on the lever 148.

Accordingly, the lever 148 rotates toward the another direction about the axis (the arrow F1 direction in FIG. 9A and FIG. 9B) with respect to the base 118, with the coupling projection 158 engaged with the engagement pawl 180 of the clutch weight 170, and the coupling projection 156 engaged with the engagement pawl 182 of the clutch weight 172.

Figure 15:
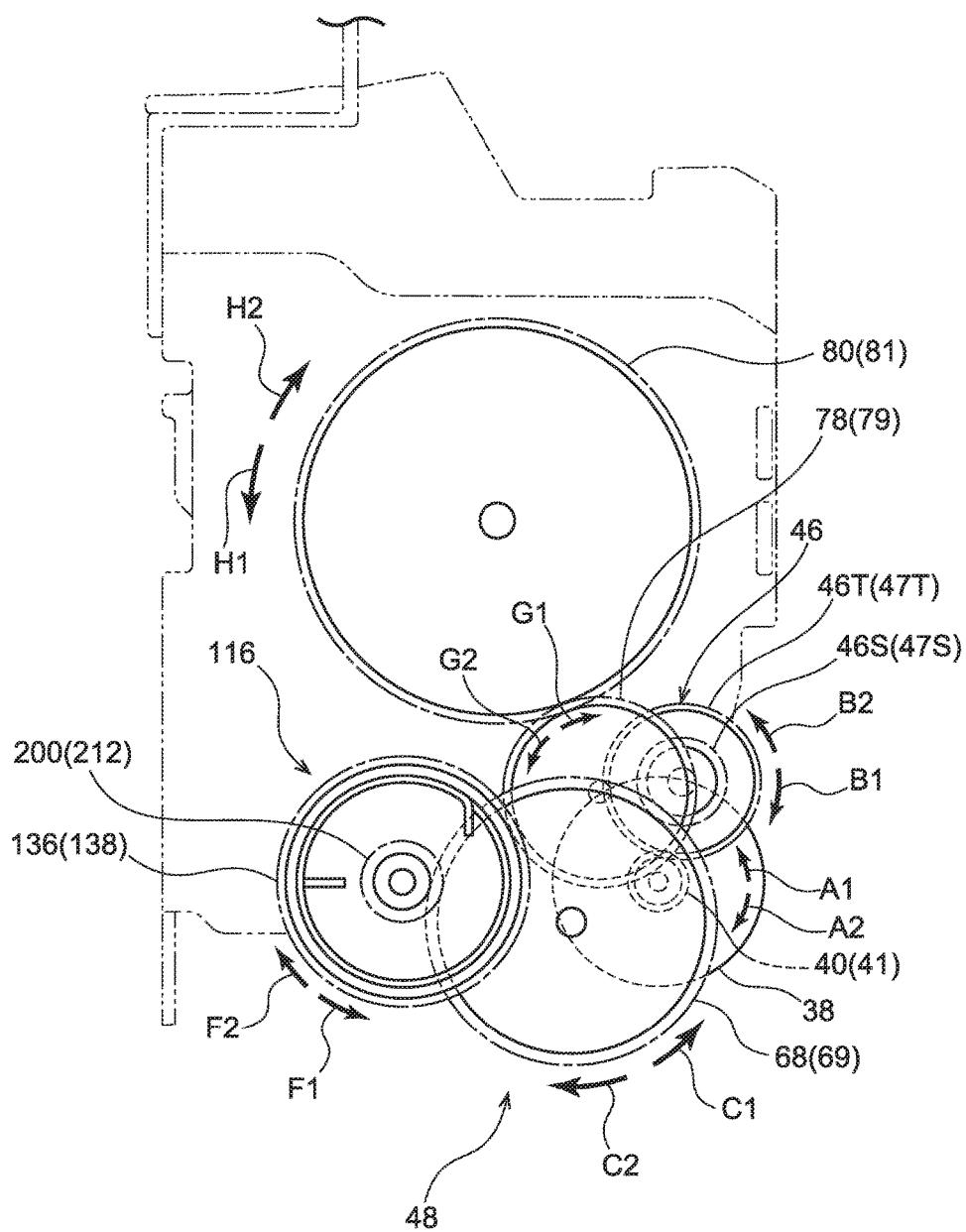
FIG. 15 is an explanatory diagram to explain a second transmission route of rotation of an output shaft of a motor during take-up assist.

When the lever 148 rotates about the axis toward the another direction with respect to the base 118, the second catch portion 146 of the clutch spring 140 is moved toward the one winding direction of the clutch spring 140 (the arrow F1 direction in FIG. 9A and FIG. 9B) by the lever 148. As a result, the external diameter dimension of the coil portion 141 of the clutch spring 140 increases, placing the outer peripheral portion of the coil portion 141 of the clutch spring 140 in close contact with the inner peripheral face of the clutch gear 136. The rotation of the clutch spring 140 is thereby transmitted to the clutch gear 136, and the clutch gear 136 rotates toward the arrow F2 direction. As illustrated in FIG. 15, the outer teeth 138 of the clutch gear 136 are meshed together with the outer teeth 79 of the idle gear 78, such that the idle gear 78 is rotated in the arrow G1 direction. The spool gear 80 is rotated in the arrow H1 direction by the idle gear 78, rotating the spool 20 in the take-up direction together with the spool gear 80. The rotation of the spool 20 makes up (compensates) the insufficiency in the urging force of the retractor spring 82 to take up and store the webbing in a layered shape on the spool 20 (what is known as "take-up assist").

Moreover, when this occurs, since the spool 20 rotates with a lower torque than during the fitting assist described above, the webbing can be safely taken up and stored onto the spool 20. In the present exemplary embodiment, the webbing can easily be pulled out from the spool 20 even when performing the take-up assist described above. Namely, the spool 20 can easily be rotated in the pull-out direction against the torque of the take-up assist.

When the webbing has been fully taken up on the spool 20, the power supply to the motor 38 is cut off by the motor controller, stopping rotation of the output shaft of the motor 38.

When the rotation of the motor 38 stops, the clutch weight 170 and the clutch weight 172 rotate toward the radial direction inside of the base 118 under the elastic force of the clutch spring 140 and the elastic force of the return spring 164 acting on the lever 148. The clutch spring 140 accordingly returns once more to its natural state, and the outer peripheral portion of the coil portion 141 separates from the inner peripheral face of the clutch gear 136, immediately releasing the coupling between the clutch spring 140 and the clutch gear 136 described above. The coupling of the spool 20 to the output shaft of the motor 38 through the second clutch 116 is thereby released, allowing the webbing taken up on the spool 20 to be pulled out again.

Figure 16:
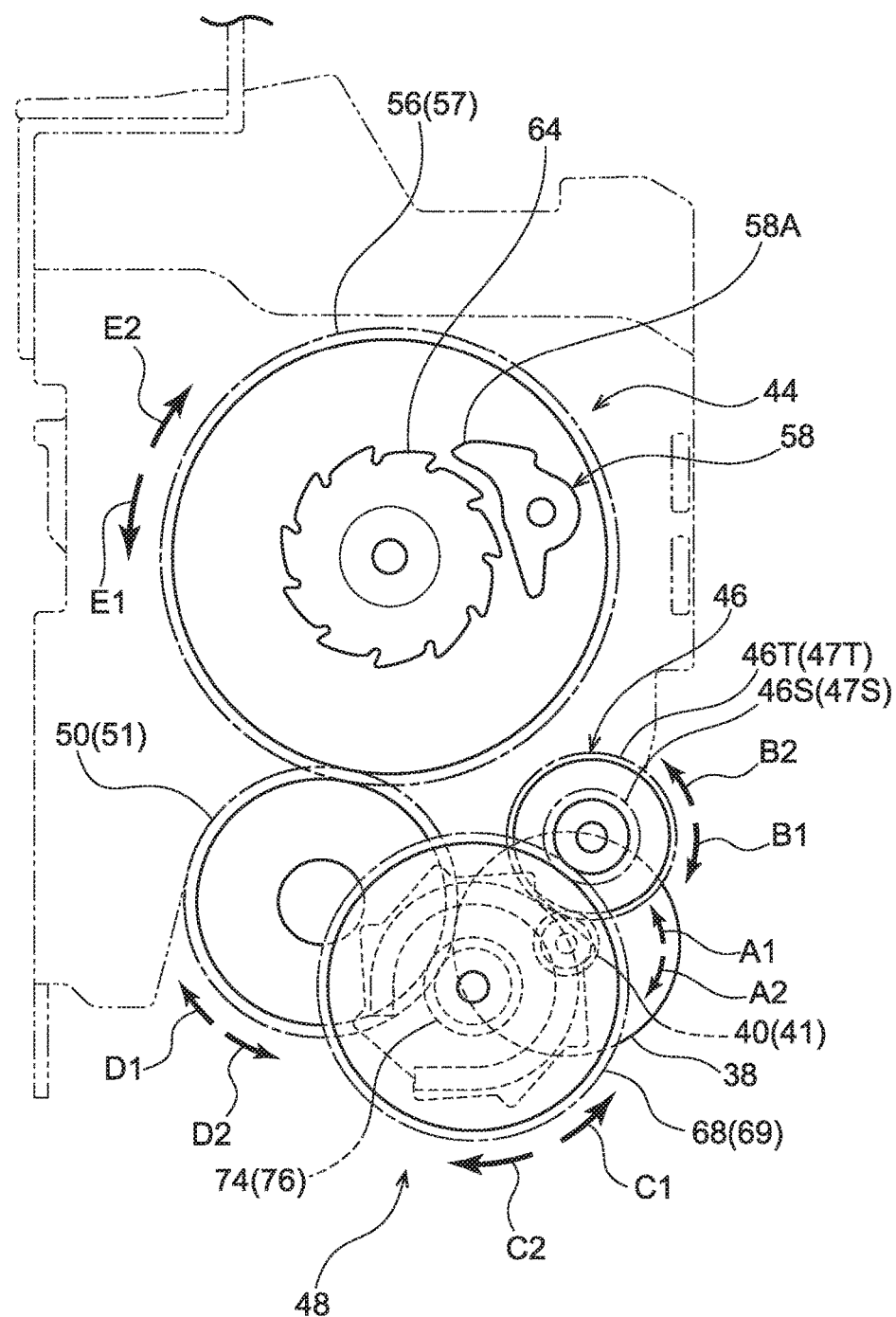
FIG. 16 is an explanatory diagram to explain a first transmission route of rotation of an output shaft of a motor during take-up assist.

Note that as illustrated in FIG. 16, the rotation of the output shaft of the motor 38 in the reverse direction during the take-up assist is transmitted to the clutch gear 56 of the first clutch 44 through the A-gear 40, the B-gear 46, the OL-gear 48, and the C-gear 50, and the clutch gear 56 is rotated in the arrow E2 direction. When this occurs, the lock bar 58 supported by the clutch gear 56 does not engage with the ratchet 64. As a result, the rotation of the output shaft of the motor 38 in the reverse direction during the take-up assist is not transmitted to the spool 20 through the first transmission route (through the A-gear 40, the B-gear 46, the OL-gear 48, the C-gear 50, and the first clutch 44).

As illustrated in FIG. 15, during the fitting assist and during the pre-tensioning, the rotation of the output shaft of the motor 38 in the forward direction is transmitted to the input gear 200 through the A-gear 40, the B-gear 46, and the OL-gear 48, and the input gear 200 is rotated in the arrow F2 direction. When this occurs, the input gear 200 rotates idly with respect to the sub clutch spring 202, such that the rotation force of the input gear 200 is not transmitted to the rotor plate 128 through the sub clutch spring 202. Namely, in the present exemplary embodiment, the second clutch 116 is capable of suppressing rotation of the second clutch 116 in a case in which there is no need to transmit the rotation force of the input gear 200 to the spool 20 through the idle gear 78 and the spool gear 80. In other words, non-need actuation (rotation) of the second clutch 116 can be suppressed.

In the present exemplary embodiment, the portion 216A of the coil portion 216 of the sub clutch spring 202, which is on the opposite side to the side where the catch portion 218 is provided, is disposed inside the housing recess 214 formed in the gear portion 206 of the input gear 200. This thereby enables space to be saved in the space where the sub clutch spring 202 is disposed between the input gear 200 and the rotor plate 128 of the second clutch 116. As a result, this enables an increase in size of the webbing take-up device 10 to be suppressed.

Note that in the present exemplary embodiment, explanation has been given regarding an example in which part of the sub clutch spring 202 is disposed inside the housing recess 214 formed on the radial direction inside of the gear portion 206 of the input gear 200. However, the present invention is not limited thereto. In consideration of the configuration of the sub clutch spring 202 and the like, appropriate settings may be made to dispose part or all of the sub clutch spring 202 at a radial direction inside portion of the gear portion 206 of the input gear 200.

In the present exemplary embodiment, explanation has been given regarding an example of a configuration in which the sub clutch spring 202 configured as described above is provided between the input gear 200 and the second clutch 116, such that rotation force of the input gear 200 toward the another side about its axis (in the arrow F2 direction) is transmitted to the second clutch 116 through the sub clutch spring 202, and transmission of rotation force of the input gear 200 toward the one side about its axis (in the arrow F1 direction) to the second clutch 116 is shut off. However, the present invention is not limited thereto. For example, in place of the sub clutch spring 202 described above, another sub clutch may be provided that is capable of transmitting rotation force of the input gear 200 toward the another side about its axis (in the arrow F2 direction) to the second clutch 116, and that is capable of shutting off (blocking) transmission of rotation force of the input gear 200 toward the one side about its axis (in the arrow F1 direction) to the second clutch 116.

Clutch Springs According to Modified Examples

Next, explanation follows regarding sub clutch springs 220, 222 according to modified examples of the exemplary embodiment described above, with reference to FIG. 17 and FIG. 18. Note that portions with the same functions as in sub clutch spring 202 of the exemplary embodiment described above are allocated the same reference numerals as in the exemplary embodiment described above, and explanation thereof is omitted.

Figure 17:
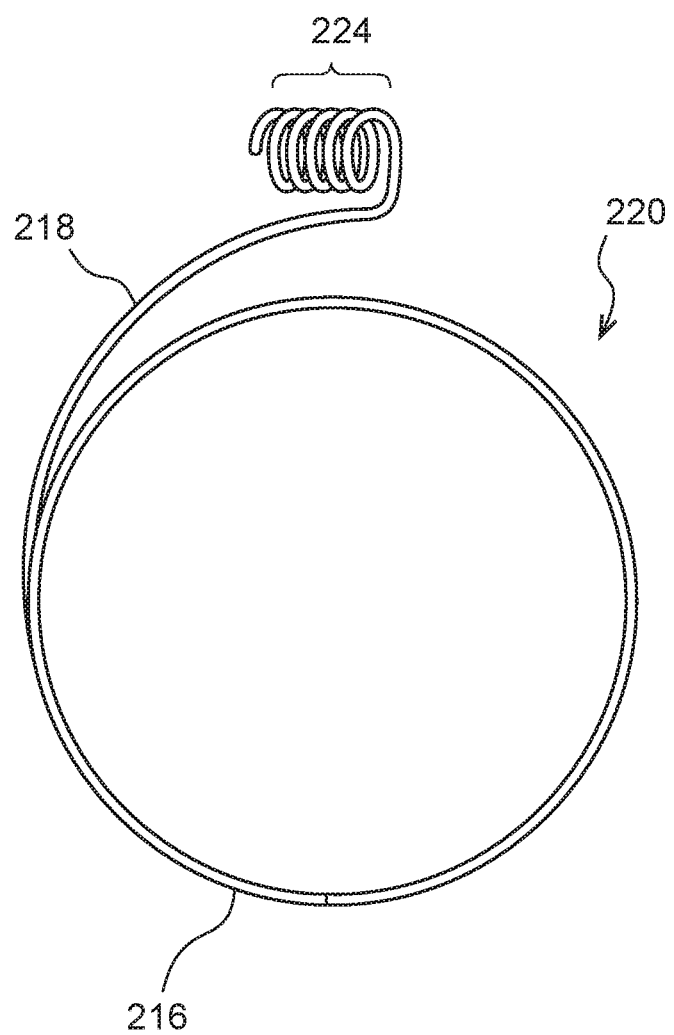
FIG. 17 is an enlarged front view illustrating a sub clutch spring according to a first modified example.

As illustrated in FIG. 17, the sub clutch spring 220 according to a first modified example is formed with a coil spring portion 224 at a leading end side of a catch portion 218. In the sub clutch spring 220, when rotation force of the input gear 200 toward the another side about its axis (in the arrow F2 direction) is transmitted to the second clutch 116 through the sub clutch spring 220, the coil spring portion 224 of the sub clutch spring 220 undergoes deformation. This thereby enables a sudden increase in the rotation force input to the second clutch 116 from the input gear 200 to be suppressed.

Figure 18:
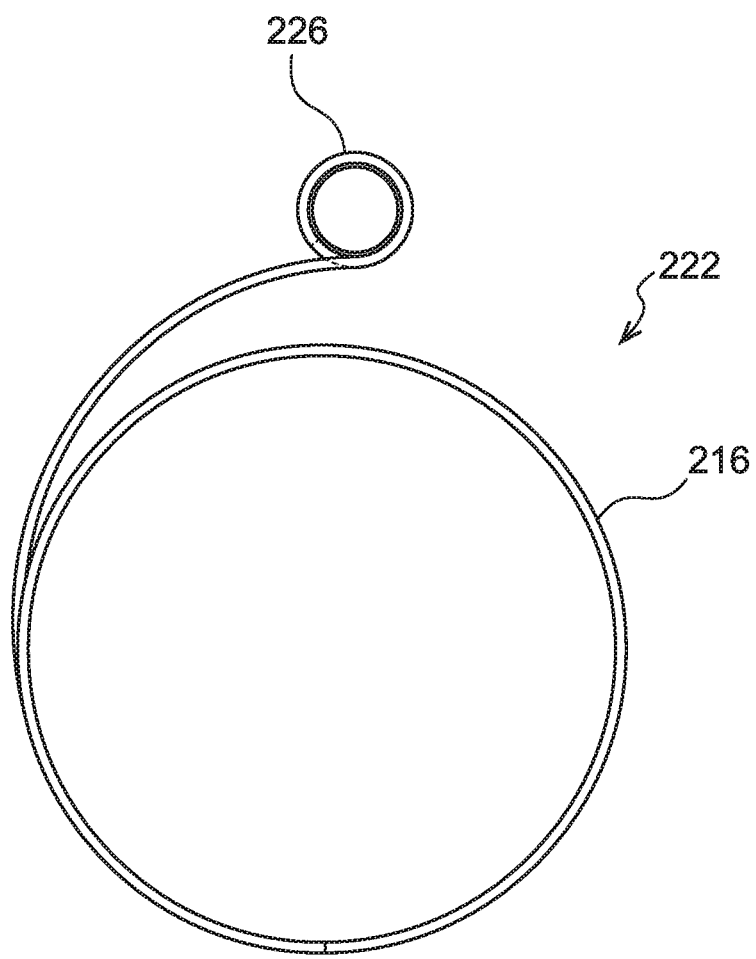
FIG. 18 is an enlarged front view corresponding to FIG. 17 illustrating a sub clutch spring according to a second modified example.

As illustrated in FIG. 18, the sub clutch spring 222 according to a second modified example includes an end portion formed in a circular ring shape, which is on one side of the sub clutch spring 222. The portion formed in the circular ring shape configures a catch portion 226 engaging with the rotor plate 128. The catch portion 226 is caught at a circular column shaped caught-at portion formed at the rotor plate 128. The sub clutch spring 222 enables stress acting on the catch portion 226 to be alleviated when rotation force of the input gear 200 toward the another side about its axis (in the arrow F2 direction) is transmitted to the second clutch 116 through the sub clutch spring 222.

Explanation has been given regarding one exemplary embodiment of the present invention. However, the present invention is not limited to the above, and obviously various other modifications to the above may be implemented.

What is claimed is:

1. A webbing take-up device comprising:
a spool that takes up a webbing worn by an occupant;
a motor that outputs rotation force by being operated;
a first rotating body that is provided in a transmission route of rotation force between the motor and the spool, that is rotated by rotation force outputted by the motor being transmitted thereto;
a second rotating body that is provided between the first rotating body and the spool in the transmission route that rotates the spool by the second rotating body being rotated due to rotation force being transmitted to the second rotating body from the first rotating body;
a clutch that is provided between the first rotating body and the second rotating body in the transmission route, and that transmits rotation force of the first rotating body to the second rotating body in a specific state; and
a sub clutch that is different from the clutch that is provided between the first rotating body and the clutch in the transmission route and also between the first rotating body and the second rotating body in the transmission route, that transmits rotation force of the first rotating body to the clutch in a case in which the first rotating body is rotated toward another side, and that blocks transmission of the rotation force of the first rotating body to the clutch by the first rotating body rotating idly with respect to the sub clutch in a case in which the first rotating body is rotated toward one side opposite to the another side.

2. The webbing take-up device of claim 1, wherein:
the sub clutch is configured by a sub clutch spring that includes a coil portion wound in a ring shape, a part of the sub clutch being caught at the clutch;
the rotation force of the first rotating body is transmitted to the clutch by the coil portion making pressing contact with the first rotating body in the case in which the first rotating body is rotated toward the another side; and
transmission of the rotation force of the first rotating body to the clutch is blocked by the first rotating body rotating idly with respect to the coil portion in the case in which the first rotating body is rotated toward the one side.

3. The webbing take-up device of claim 2, wherein: the first rotating body is configured including a shaft portion that is rotatably supported by the clutch, and a gear portion that is integrally provided at the shaft portion; and at least a portion of the coil portion is disposed at a radial direction inner side of the gear portion.

4. The webbing take-up device of claim 3, wherein the coil portion of the sub clutch is wound on the shaft portion in a direction such that:
diameter dimension of the coil portion decreases in the case in which the first rotating body is rotated toward the another side; and
the diameter dimension of the coil portion increases in the case in which the first rotating body is rotated toward the one side.

5. The webbing take-up device of claim 2, wherein the coil portion of the sub clutch is wound in a direction such that:
diameter dimension of the coil portion decreases in the case in which the first rotating body is rotated toward the another side; and
the diameter dimension of the coil portion increases in the case in which the first rotating body is rotated toward the one side.

6. The webbing take-up device of claim 1, wherein
the clutch is configured to include a rotor, a clutch member and a clutch gear,
the clutch member transmits rotation force from the rotor to the clutch gear in the specific state, and the clutch gear rotates the second rotating body by the clutch gear being rotated due to rotation force being transmitted to the clutch gear from the rotating body,
the sub clutch transmits rotation force of the first rotating body to the rotor in the case in which the first rotating body is rotated toward the another side, and that blocks transmission of the rotation force of the first rotating body to the rotor by the first rotating body rotating idly with respect to the sub clutch in the case in which the first rotating body is rotated toward the one side, the sub clutch is a member which is different from the clutch member, and the sub clutch is provided between the first rotating body and the clutch member in the transmission route.

7. The webbing take-up device of claim 6, wherein the sub clutch is provided between the first rotating body and the rotor in the transmission route, the rotor is provided between the sub clutch and the clutch member in the transmission route, and the clutch member is provided between the rotor and the clutch gear in the transmission route.

8. The webbing take-up device of claim 1, wherein the clutch transmits rotation force of the first rotating body to the second rotating body in the specific state in which magnitude of rotation torque of the first rotating body toward another side is a specific value or greater.

* * * * *